July 14, 1953  V. V. WOOD ET AL  2,645,476
FOLDING AND STACKING MACHINE
Filed Oct. 1, 1948   18 Sheets-Sheet 2

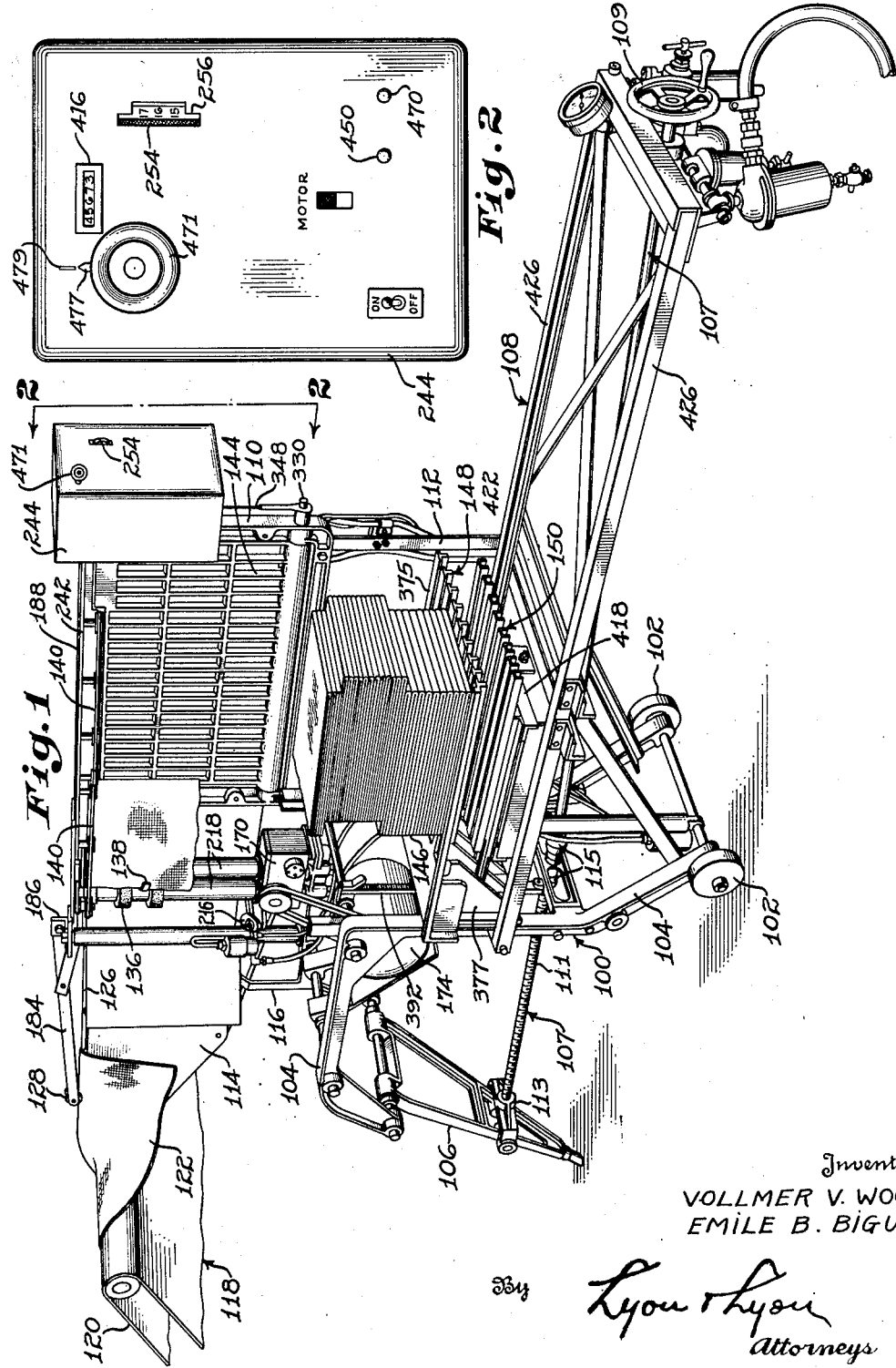

Inventors
VOLLMER V. WOOD
EMILE B. BIGUE
By
Lyon & Lyon
Attorneys

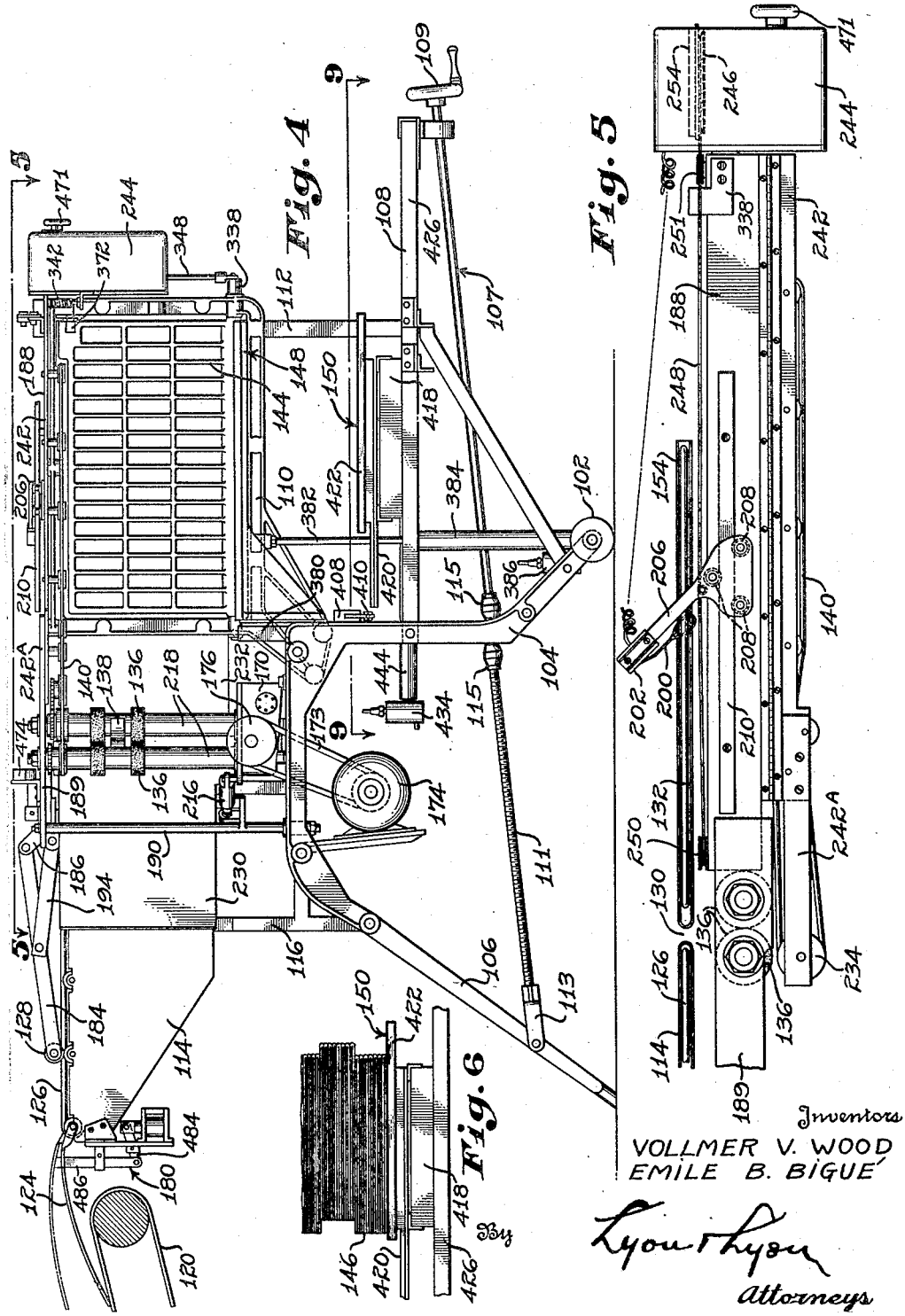

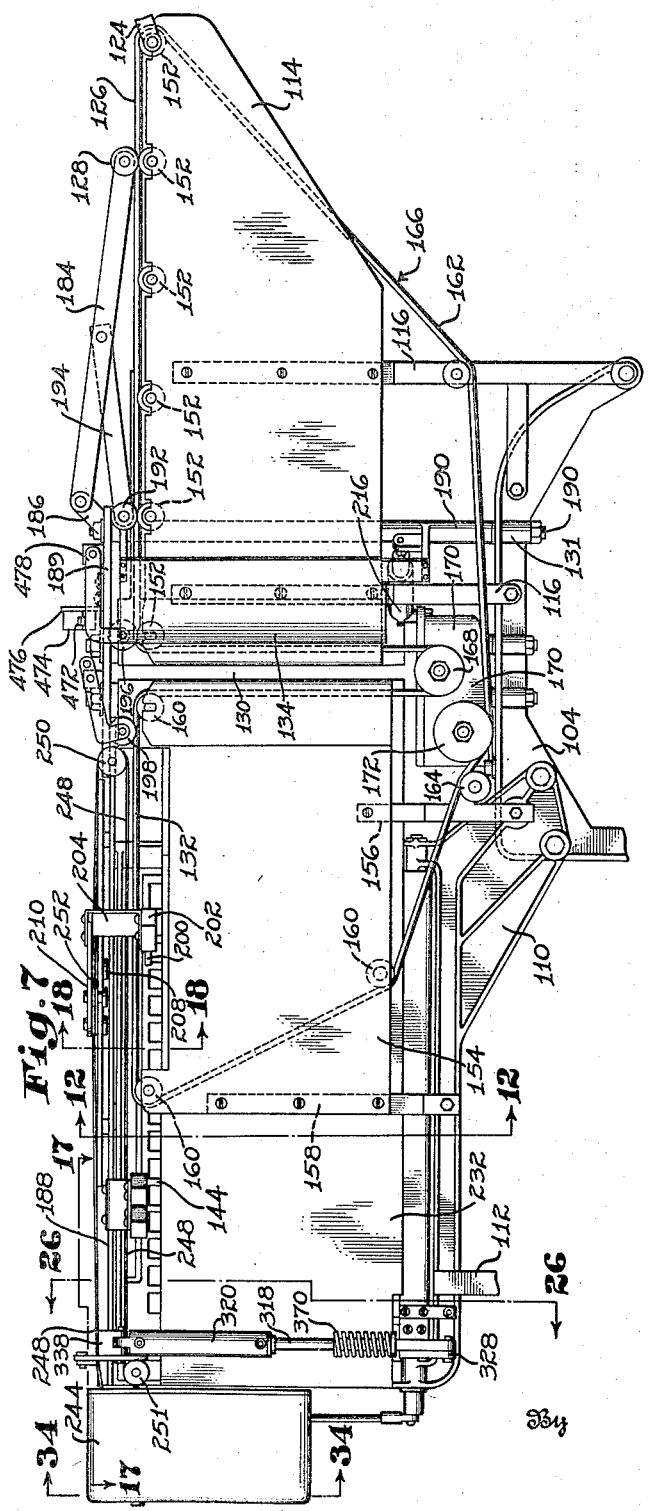
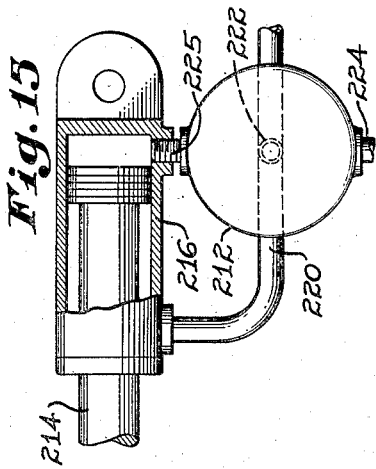

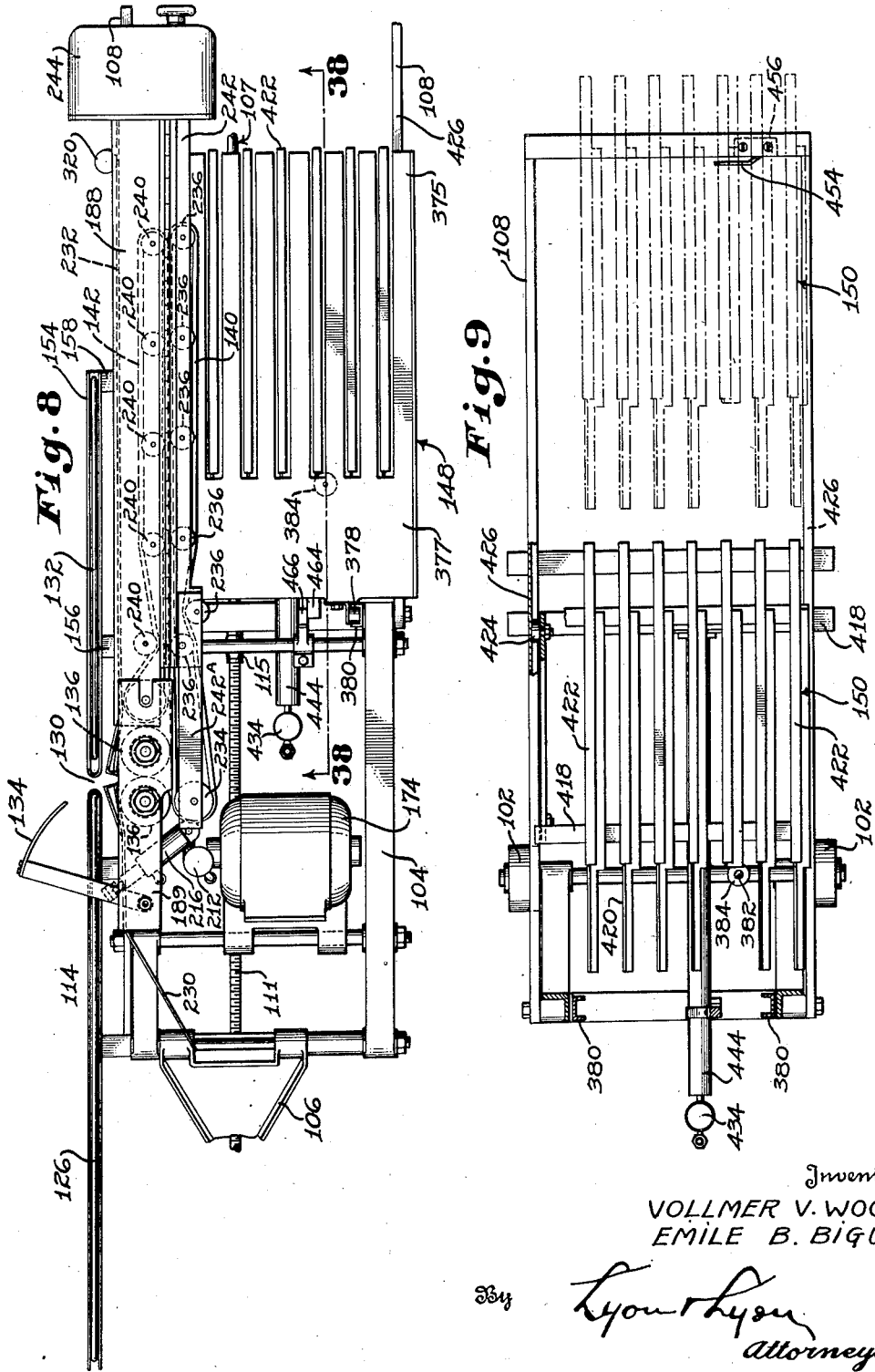

July 14, 1953  V. V. WOOD ET AL  2,645,476
FOLDING AND STACKING MACHINE
Filed Oct. 1, 1948  18 Sheets-Sheet 6
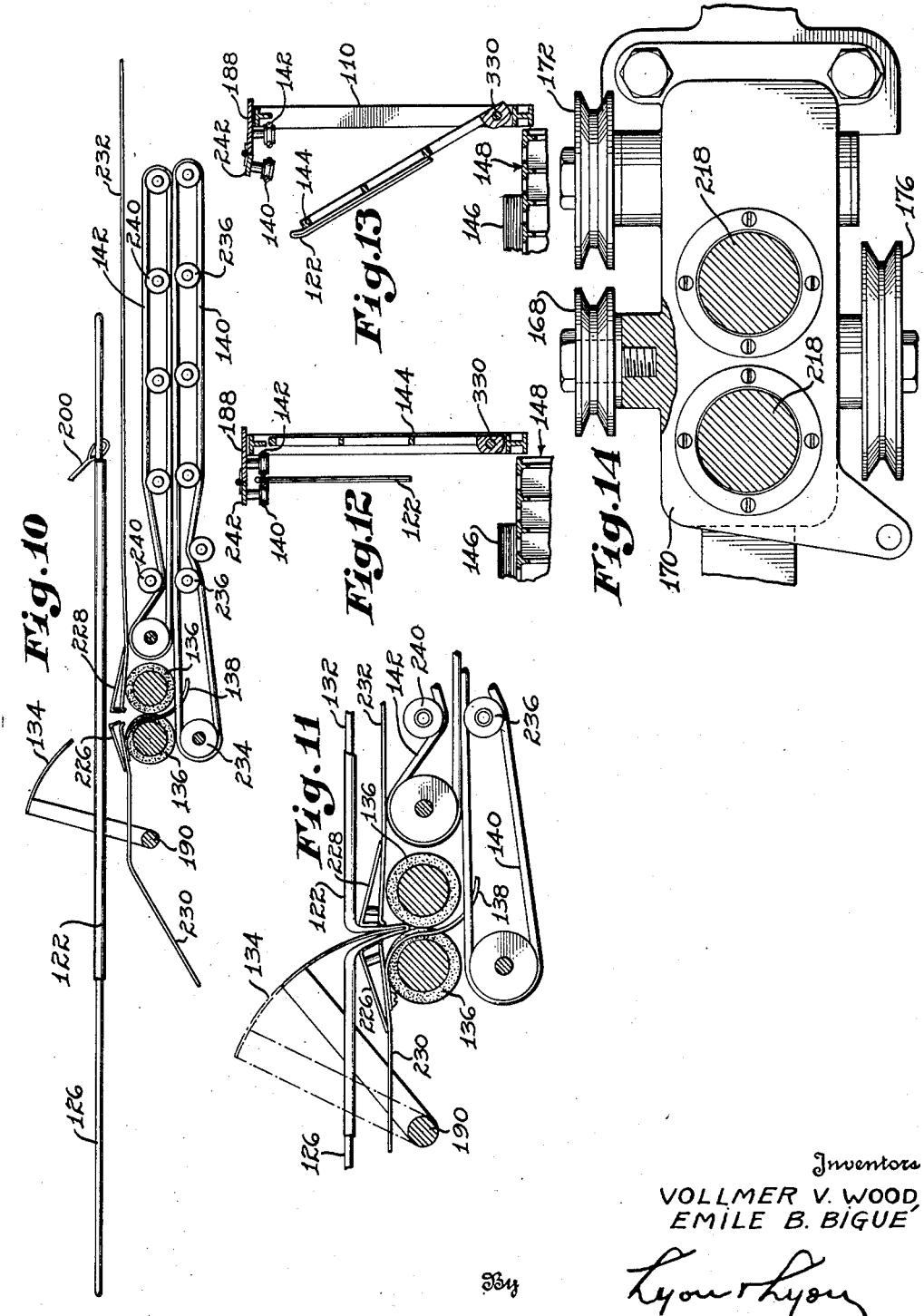
Inventors
VOLLMER V. WOOD
EMILE B. BIGUÉ
By
Lyon & Lyon
Attorneys

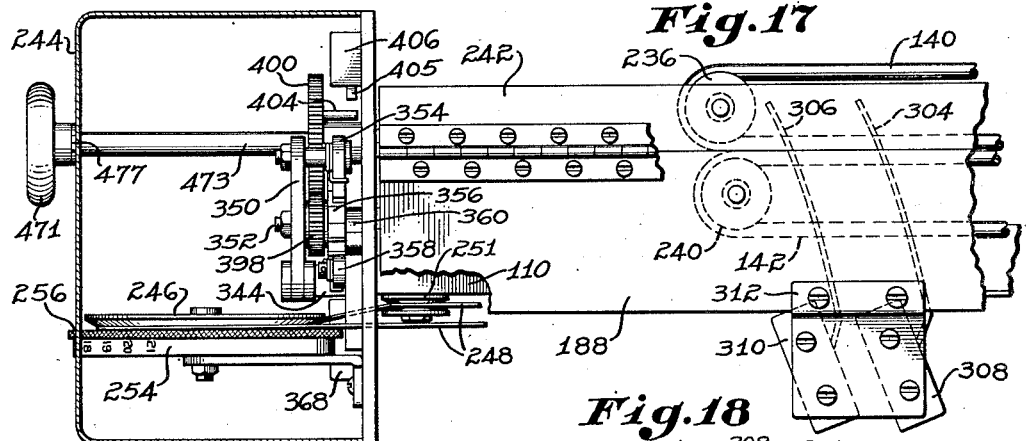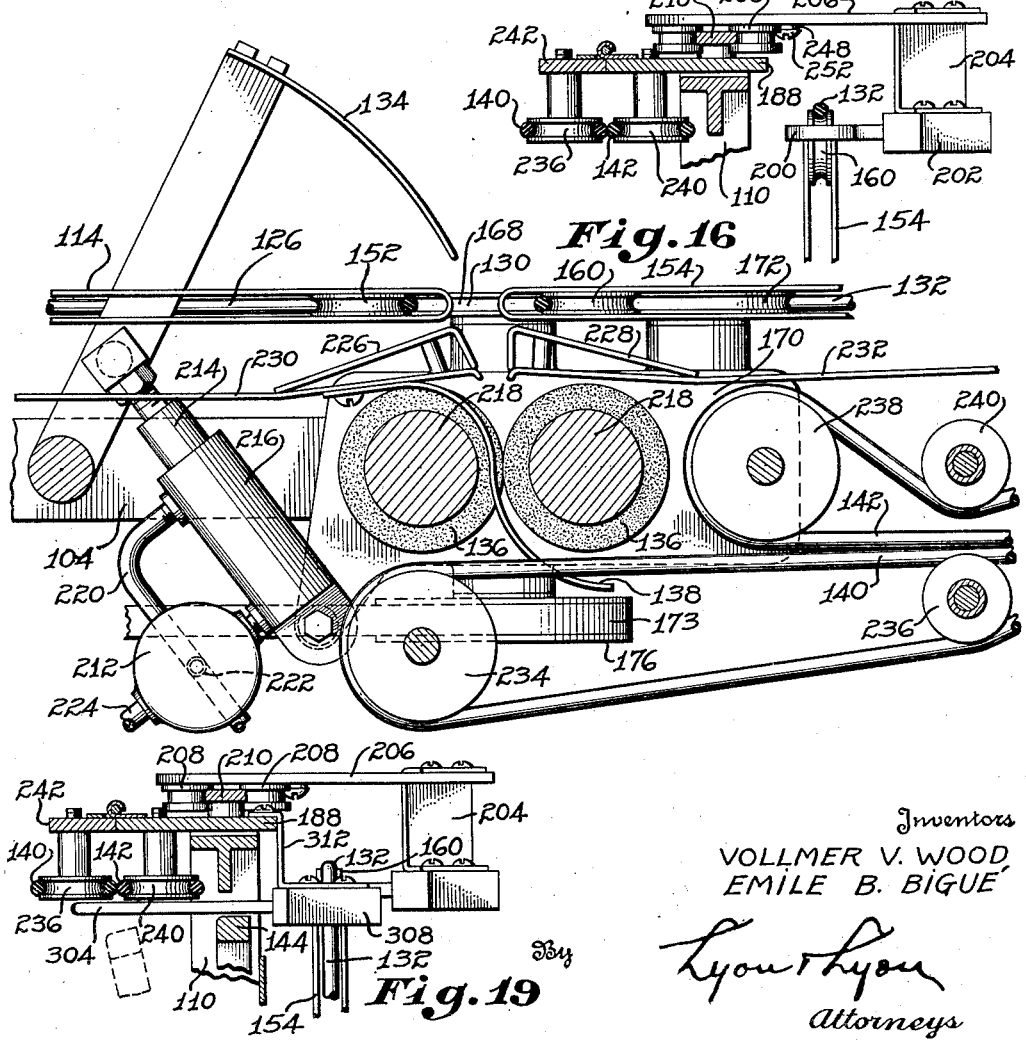

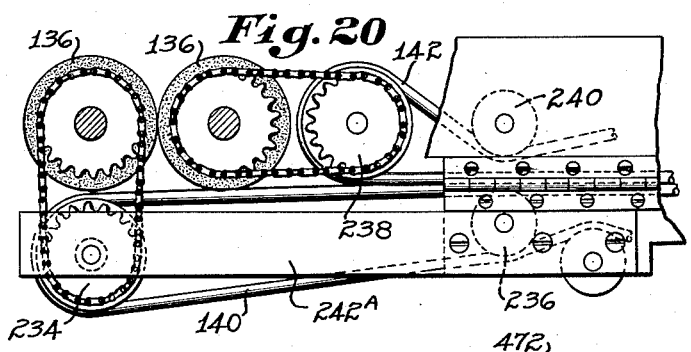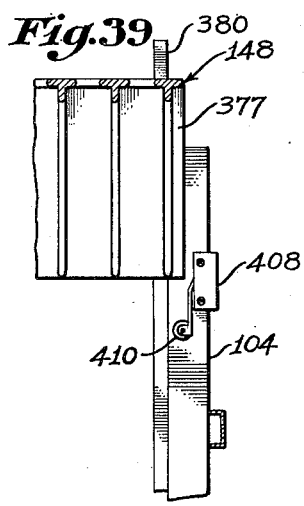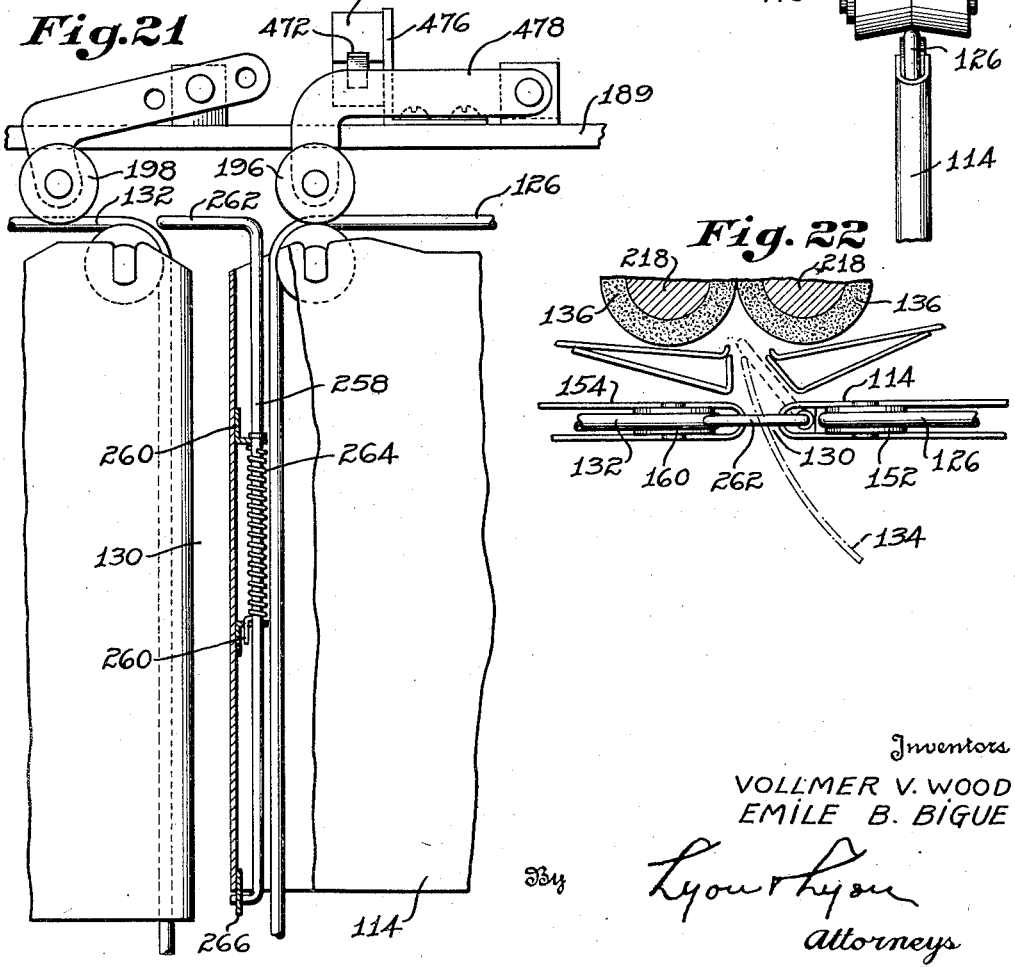

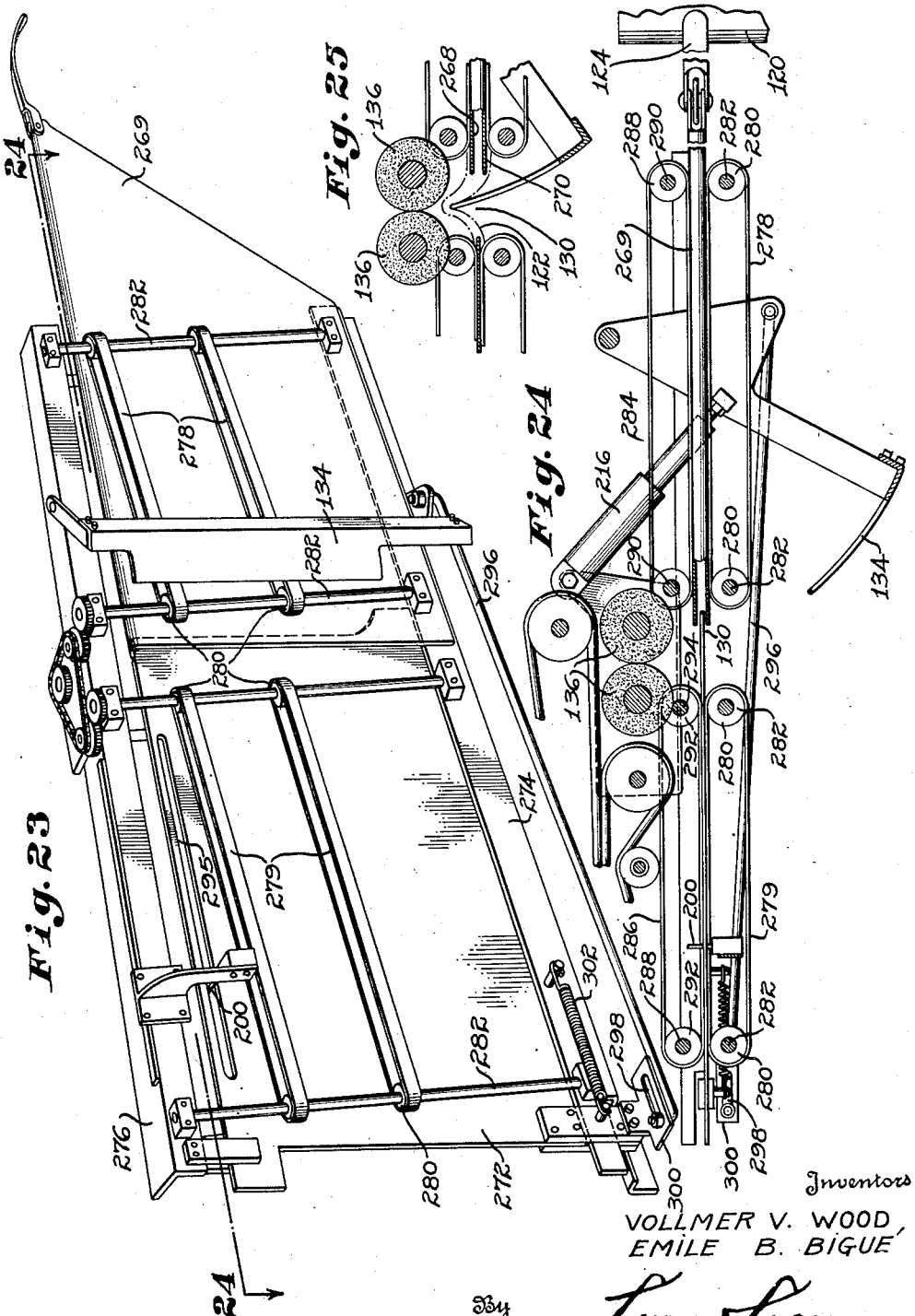

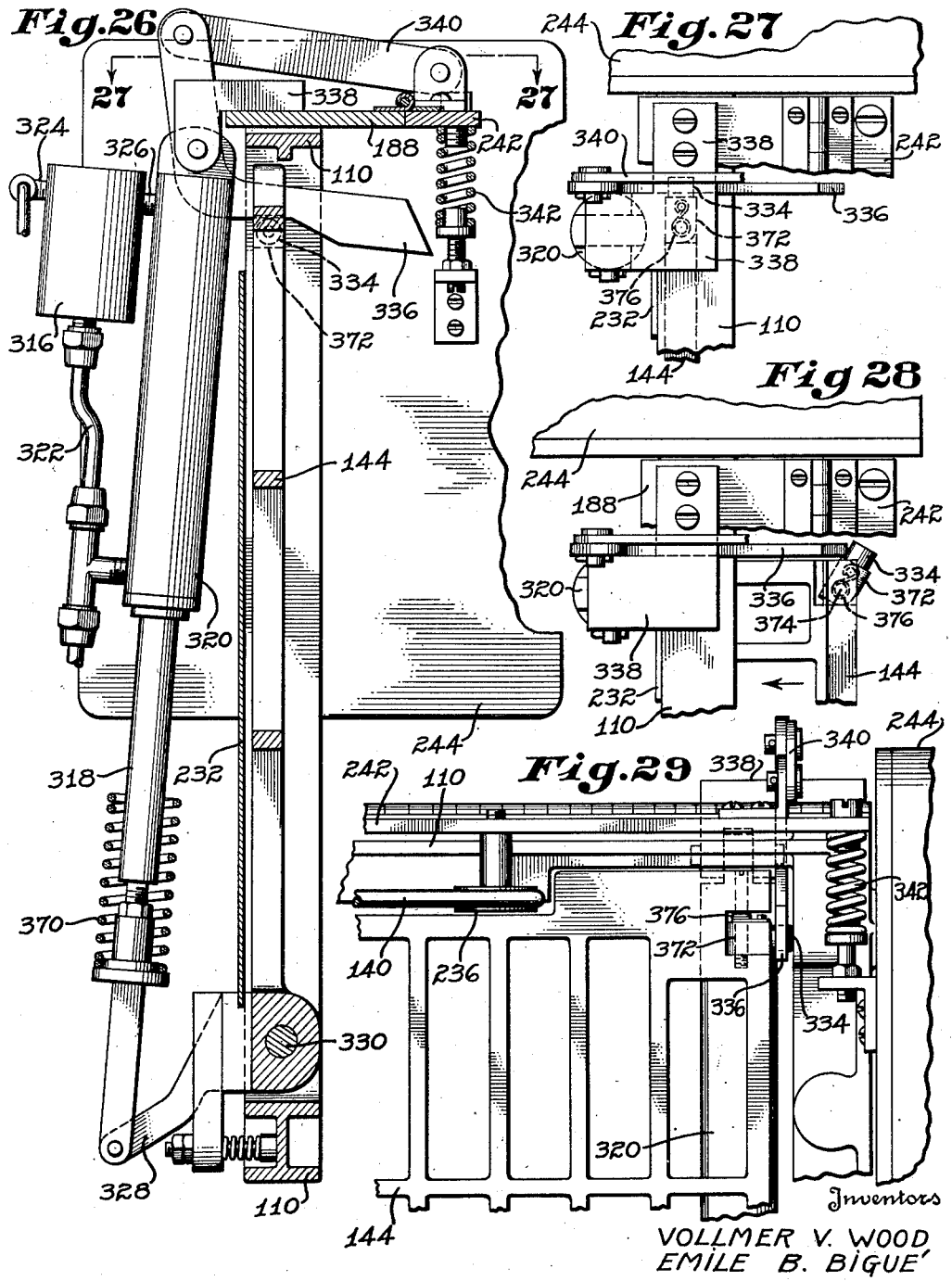

July 14, 1953  V. V. WOOD ET AL  2,645,476
FOLDING AND STACKING MACHINE
Filed Oct. 1, 1948  18 Sheets-Sheet 11
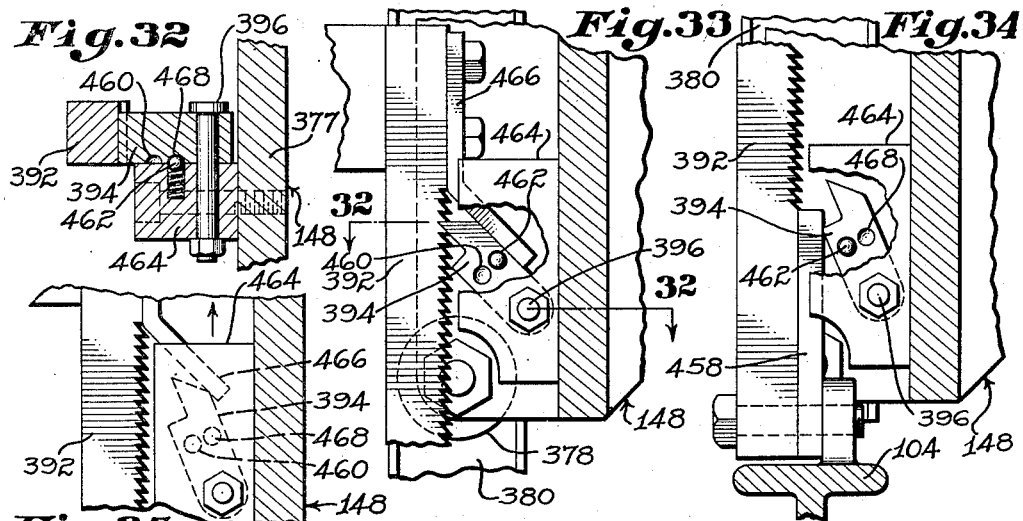
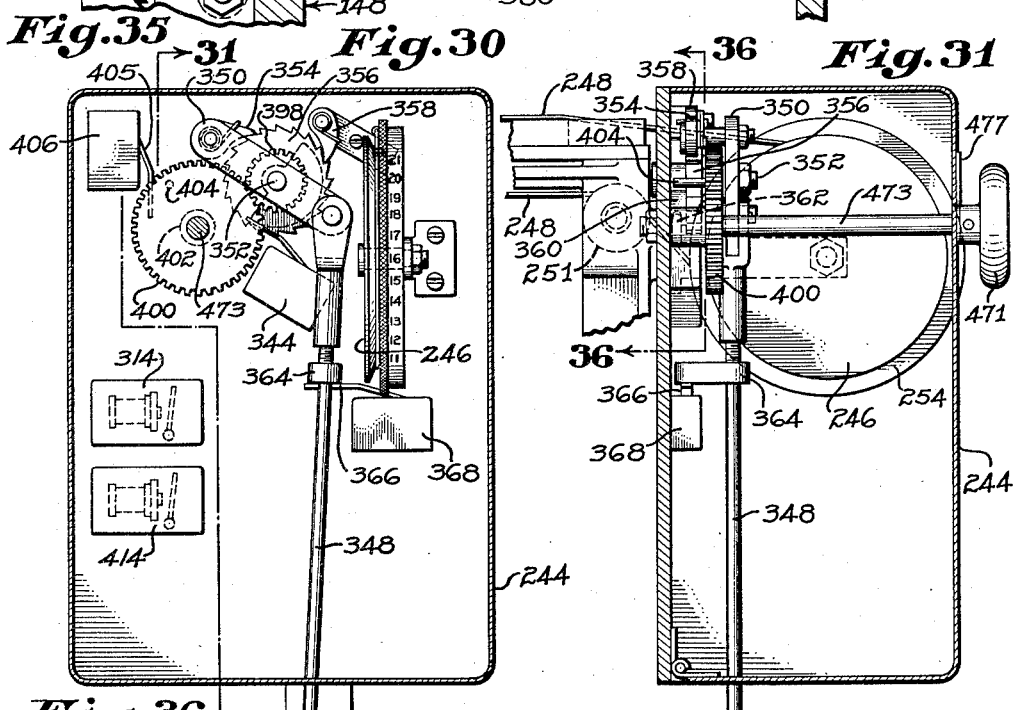
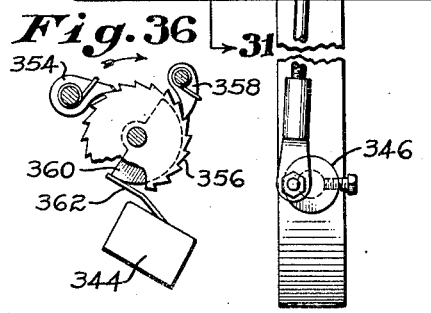
Inventors
VOLLMER V. WOOD
EMILE B. BIGUÉ
By Lyon & Lyon
Attorneys

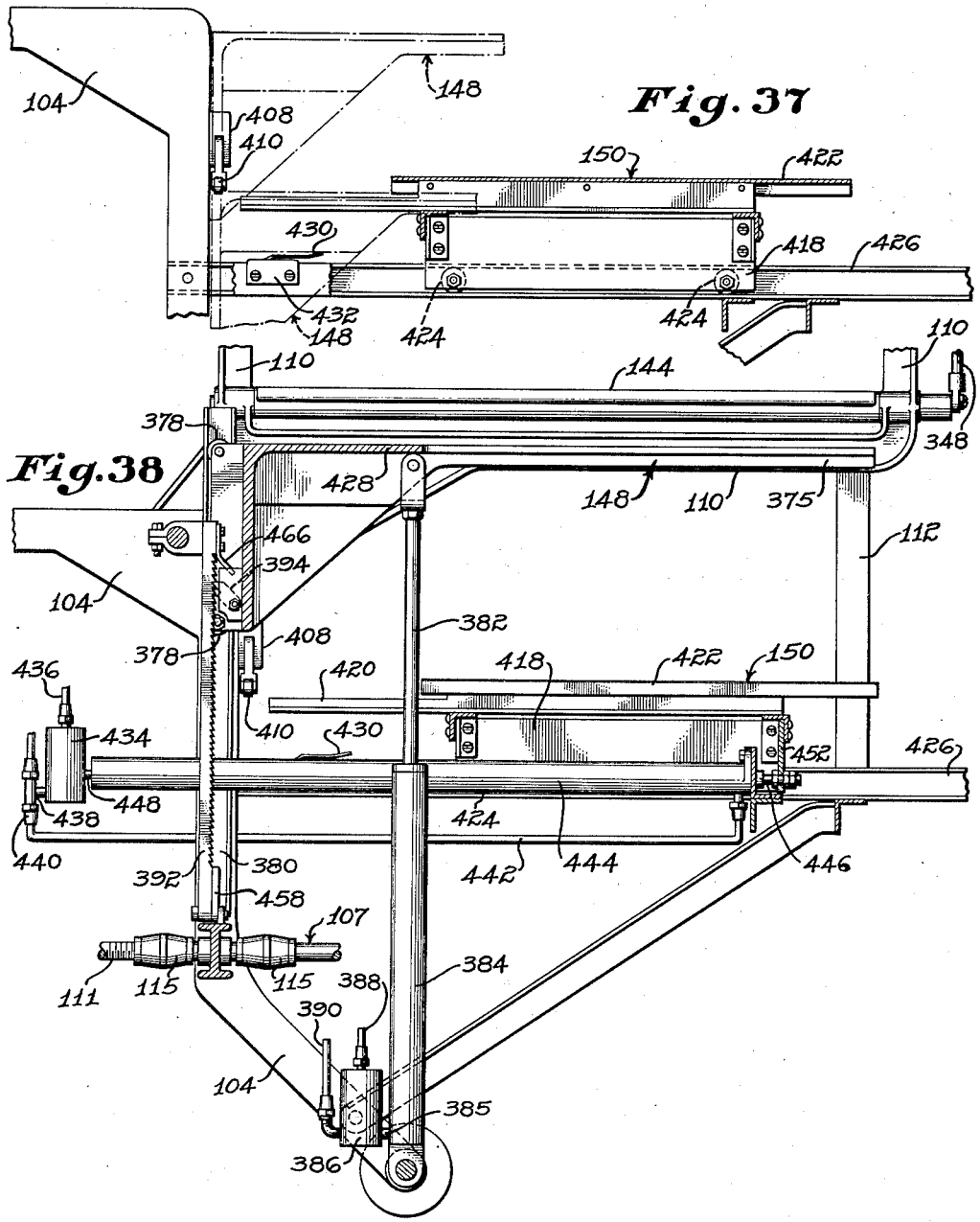

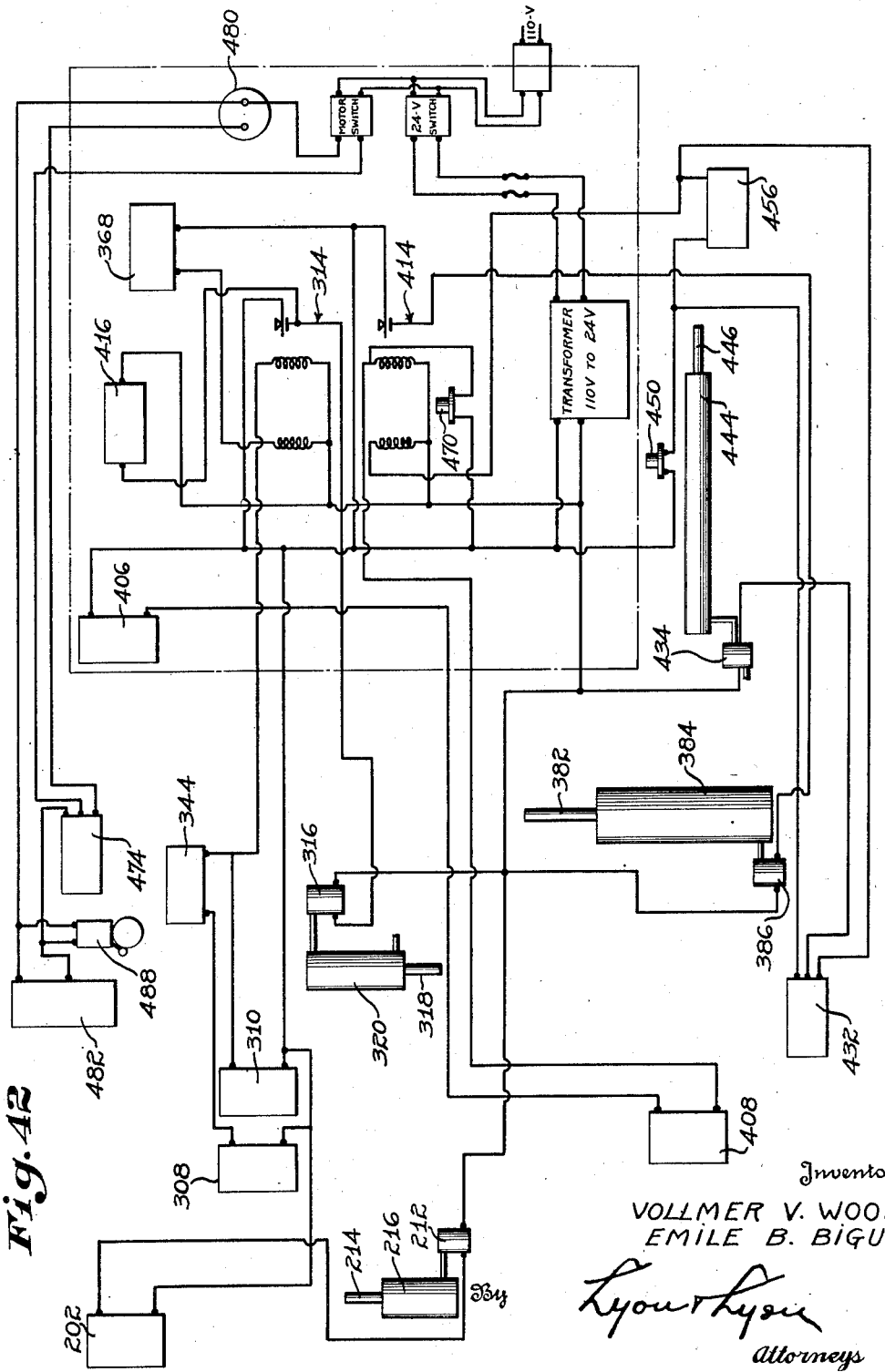

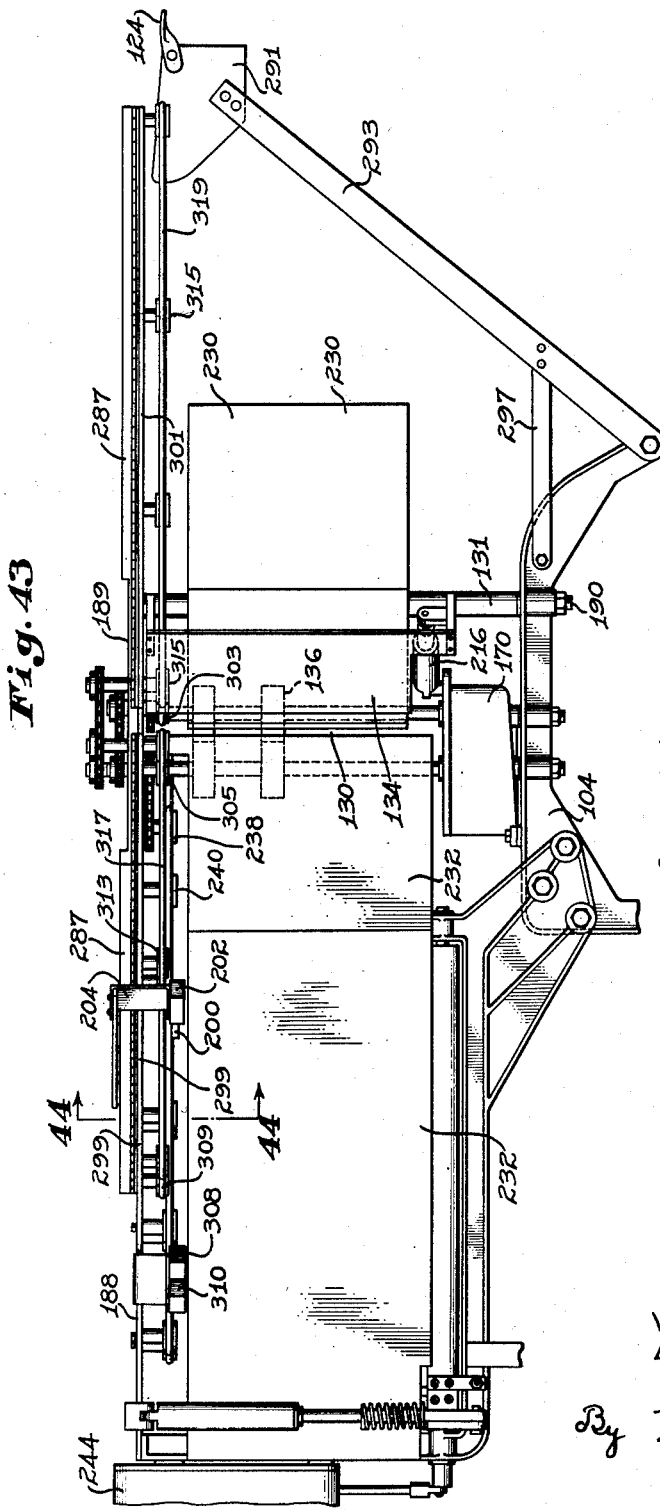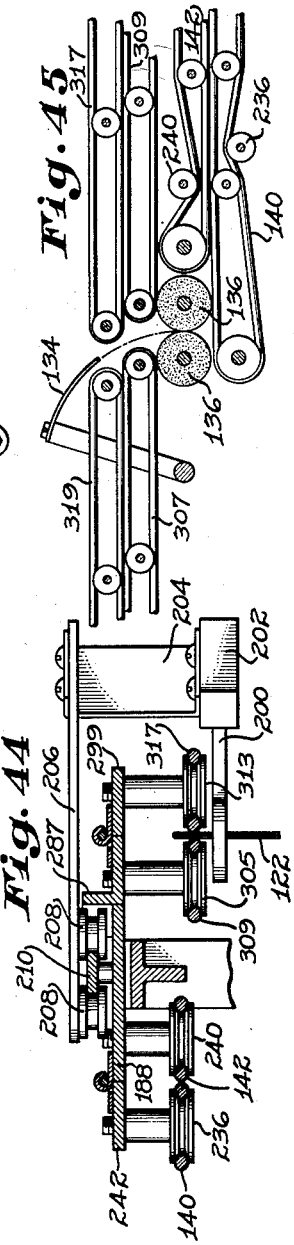

July 14, 1953 V. V. WOOD ET AL 2,645,476
FOLDING AND STACKING MACHINE
Filed Oct. 1, 1948 18 Sheets-Sheet 15
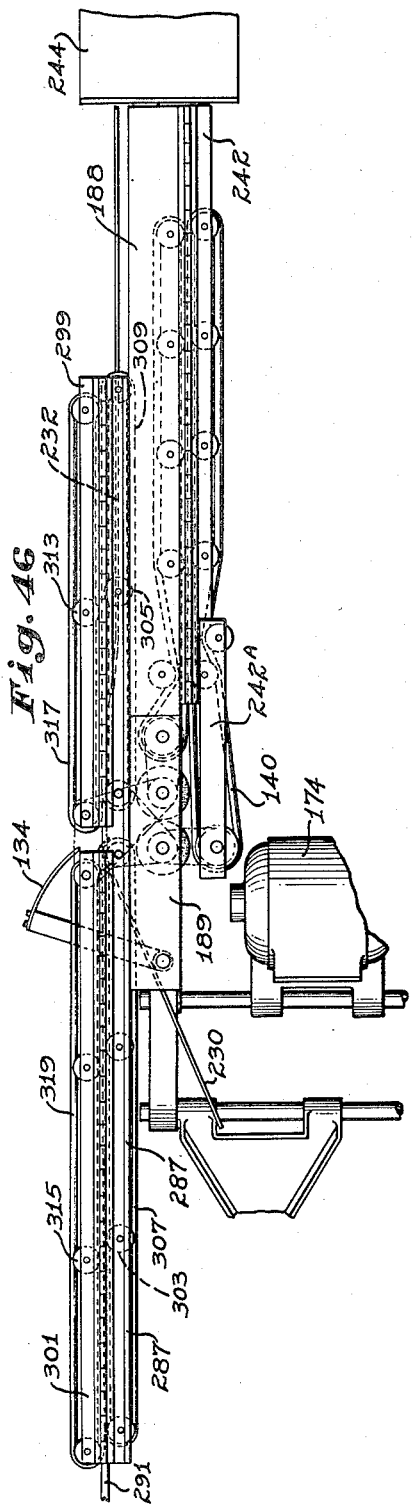
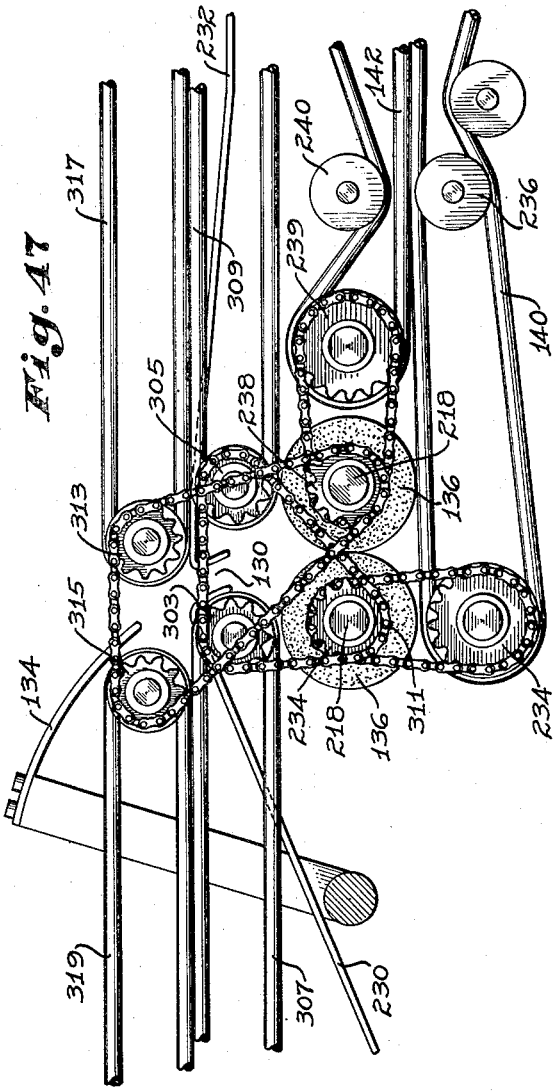
Inventors
VOLLMER V. WOOD
EMILE B. BIGUÉ
By Lyon & Lyon
Attorneys July 14, 1953  V. V. WOOD ET AL  2,645,476
FOLDING AND STACKING MACHINE
Filed Oct. 1, 1948  18 Sheets-Sheet 16

Inventors
VOLLMER V. WOOD,
EMILE B. BIGUE

By  Lyon & Lyon
Attorneys

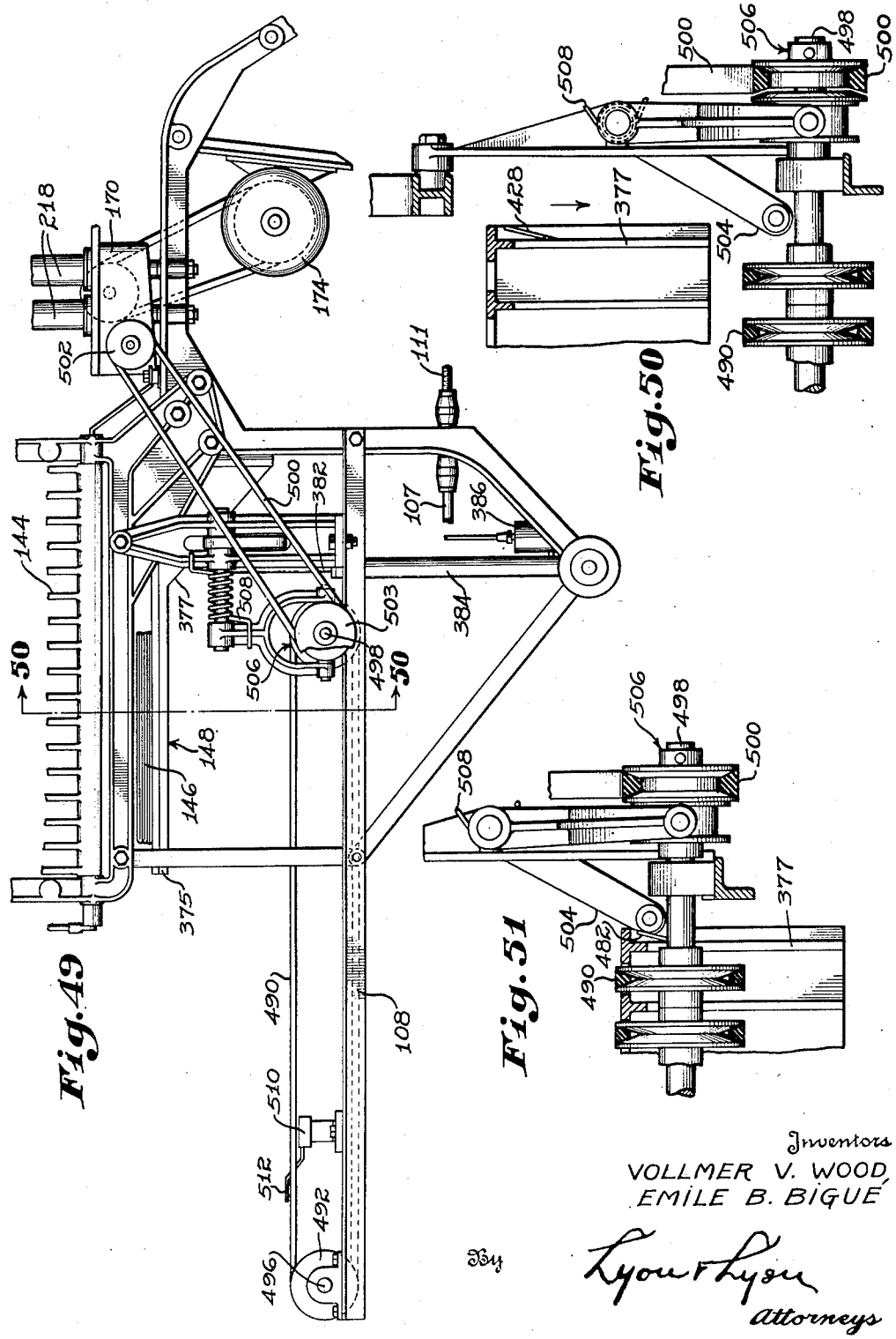

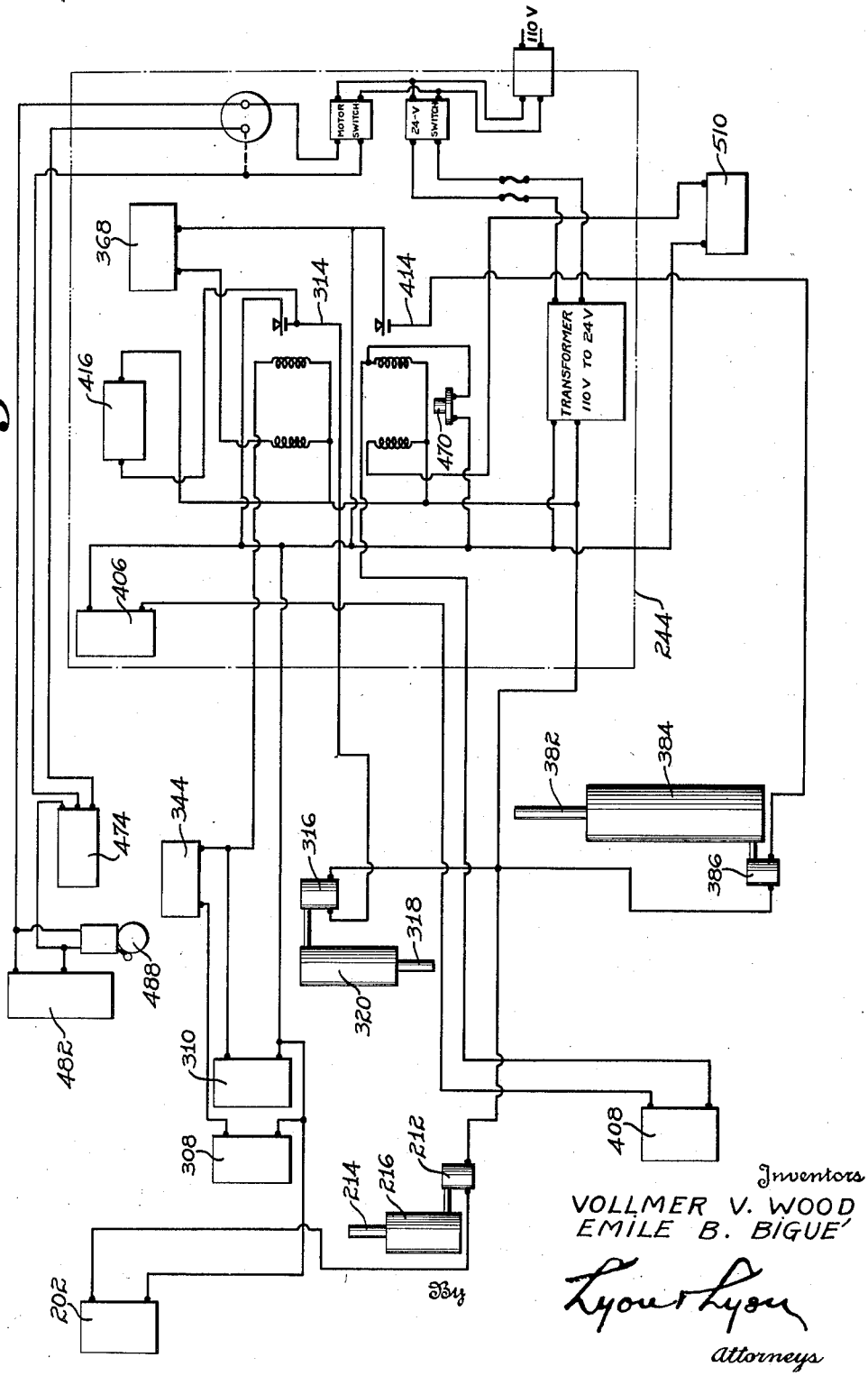

Patented July 14, 1953

2,645,476

UNITED STATES PATENT OFFICE 2,645,476

FOLDING AND STACKING MACHINE

Vollmer V. Wood, Los Angeles, and Emile B. Bigué, Beverly Hills, Calif., assignors to Pioneer Development Co., Los Angeles, Calif., a corporation of California Application October 1, 1948, Serial No. 52,392

11 Claims. (Cl. 270—80)

Our invention relates to devices for folding and stacking laundry pieces, and is particularly adaptable for first folding and thereafter stacking limp, flat articles which are not stiff enough to be handled by the ordinary machines.

The principal object of our invention is to provide an automatic machine which may, but need not be, used in conjunction with the common ironing machine, such as the mangle, to receive laundry pieces therefrom, fold said laundry pieces, pile said laundry pieces in a stack, and deliver counted stacks of pieces to the attendant.

Another of the objects of our invention is to provide mechanism for the accomplishment of the aforesaid purposes wherein the laundry pieces are handled in such a way as to be either freely suspended to prevent wrinkling or held in such manner as to stretch out wrinkling in said pieces, thereby obviating the danger of creasing, misfolding, bunching, and the like.

A further object of our invention is to provide means whereby laundry pieces fed to our machine may be picked up automatically from the ironing machine and need not be fed to our machine by hand; an additional feature used in conjunction with such pick-up means being that should pieces bunch in progressing away from the ironing machine, our device automatically disengages from the laundry machine, signals the attendant, and permits the pieces to fall therefrom to be later retrieved by said attendant.

Another object of our invention is to provide alternate forms of mechanism whereby the laundry pieces may be longitudinally folded in a free drape, positively held about the longitudinal folding members, or freely held along the line of longitudinal fold.

Difficulty having heretofore been met in imparting to a longitudinally folded laundry piece a transverse fold, while avoiding wrinkling and bunching during this operation, another of our objects is to provide means for preventing bunching and wrinkling during both the longitudinal and the transverse folding of the piece preparatory to stacking.

A further object of our invention rests in achieving the free suspension of laundry pieces as delivered from the folding mechanism so that said pieces may be thereafter stacked without creasing, wrinkling and the like.

Yet another of our objects is to provide a novel stacking mechanism utilizing air resistance to hold the pieces during the conveying thereof to the stacking platform.

A further object of our invention is to provide means in conjunction with the stacking operation whereby the stacking may be staggered for convenience into a predetermined number of pieces.

Another of our objects lies in providing a simple and uncomplicated mechanism for transferring a stack of laundry pieces from the stacking platform to a delivery member adapted to carry the stack to the attendant.

And yet another of our objects is to provide novel mechanism for counting the laundry pieces to form stacks of predetermined numbers which are automatically delivered as counted to the attendant.

Further objects of the invention will appear hereinafter.

In the drawings:

Figure 1 shows a perspective view of our folding and stacking machine showing its general construction;

Figure 2 is a view showing the face of the machine control box taken on the line 2—2 of Figure 1;

Figure 4 is a side elevational view of the machine;

Figure 5 is a partial plan view of the machine looking down from the line 5—5 of Figure 4;

Figure 6 is an elevational view of a stack of finished folded pieces as delivered on the delivery member of our machine;

Figure 7 is another side elevational view of our machine, leaving out certain lower portions thereof;

Figure 8 is another plan view of our machine with certain parts broken away;

Figure 9 is a sectional view taken on the line 9—9 of Figure 4;

Figure 10 is a plan view showing the laundry piece in its longitudinally folded position prior to being transversely folded;

Figure 11 is a view similar to Figure 10 showing the laundry piece in the process of being transversely folded;

Figure 12 is a detail sectional elevation taken on the line 12—12 of Figure 7;

Figure 13 is a similar view showing the stacker mechanism in operation;

Figure 14 is a detail plan view of the transmission box;

Figure 15 is a typical plan of the air cylinders with parts broken away to show working parts;

Figure 16 is a detail sectional plan view showing principally the transverse folding mechanism;

Figure 17 is a detailed sectional plan view with parts broken away taken on the line 17—17 of Figure 7;

Figure 18 is a detailed sectional elevation with parts broken away, taken on the line 18—18 of Figure 7;

Figure 19 is a similar view showing additional parts;

Figure 20 is a sectional plan view with certain parts broken away showing detailed portions of the transverse folding and conveying mechanisms;

Figure 21 is a detailed side view of a modification in the longitudinal and transverse folding mechanisms of our device;

Figure 22 is a detailed plan view of such modification;

Figure 23 is a perspective view of a modified form of the machine having feeding belts at an inclined angle to maintain smoothness of the material and a slidable plate to form an opening for knife travel into the folding rollers;

Figure 24 is a sectional plan view taken on line 24—24 of Figure 3;

Figure 25 is a diagrammatic top plan view of the sliding plate moved aft and the knife carrying the towel through the opening into the folding rollers;

Figure 26 is a detail sectional elevation taken on the line 26—26 of Figure 7;

Figure 27 is a detail sectional plan view, partly broken away, taken on the line 27—27 of Figure 26;

Figure 28 is a similar view showing additional parts;

Figure 29 is an enlarged detail showing a portion of the view shown in Figure 4;

Figure 30 is a detailed sectional rear elevation of the control box;

Figure 31 is a detail sectional view of the control box taken through the line 31—31 of Figure 30;

Figure 32 is a detailed sectional view taken on line 32—32 of Figure 33 showing holdback mechanism on the stacking platform;

Figure 33 is another view of said mechanism;

Figure 34 is a view similar to Figure 35 showing the mechanism in a different operating position;

Figure 35 is another such view showing the mechanism in a still different position;

Figure 36 is a detailed view of a portion of the control box taken on the line 36—36 of Figure 31;

Figure 37 is a sectional side elevation of the laundry piece delivery member and associated mechanism;

Figure 38 is a sectional elevation taken on the line 38—38 of Figure 8;

Figure 39 is a detailed elevational view, with parts broken away, of the stacking platform and limit switch associated therewith;

Figure 40 is a detailed view of a safety mechanism on our device;

Figure 42 is a block circuit diagram illustrating the electrical control and operating mechanism for the machine;

Figure 43 is a side elevation of a modified form of the machine with horizontal hinged feed belts, looking at the machine from the opposite side of the folding rollers;

Figure 44 is a sectional view taken on line 44—44 of Figure 43;

Figure 45 is a top plan view of a portion of the machine showing only the feed belt pattern, the knife travel, the folding rollers and associated means;

Figure 46 is a top plan view of the machine with the carriage mechanism not shown;

Figure 47 is an enlarged plan view of the driving means for the belt pattern;

Figure 49 is a side elevation illustrating the drive for the conveyer belts;

Figure 50 is a section taken on line 50—50 of Figure 49 showing clutch disengaged;

Figure 51 is a view similar to Figure 50 with the clutch engaged;

Figure 52 is a wiring diagram of the clutch-driven machine.

Figure 3:
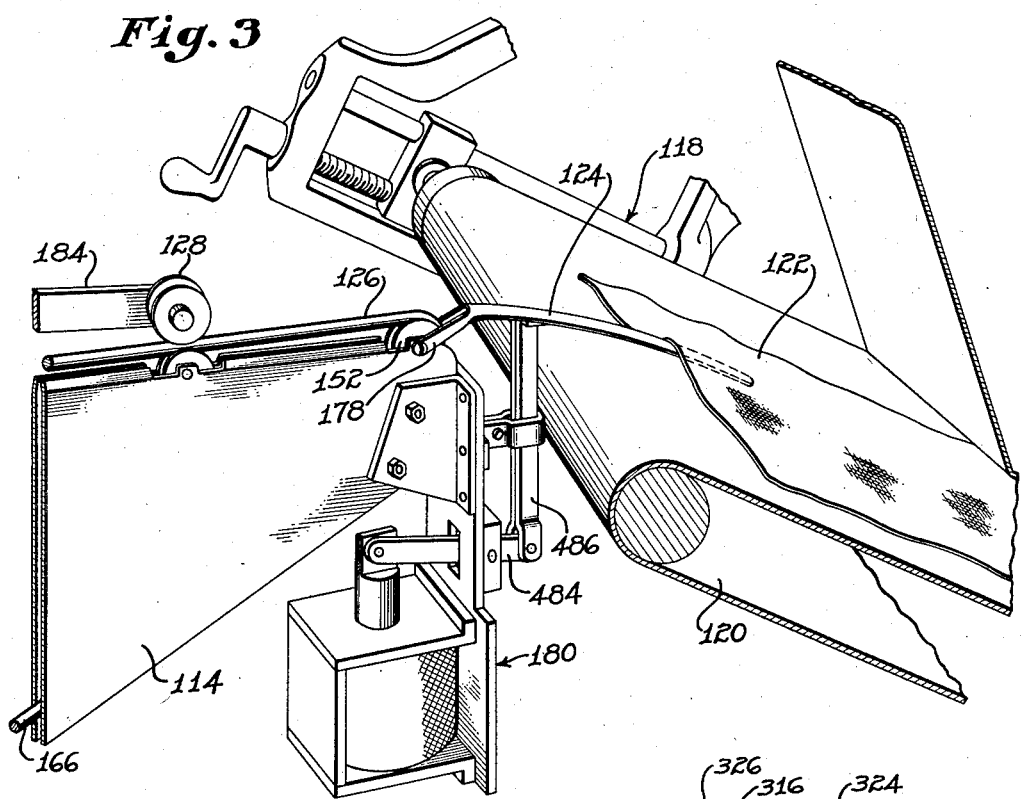
Figure 3 is a perspective view of the laundry piece receiving end of the machine.

Referring to the drawings, particularly Figure 1, our device consists generally of a framework designated 100 which is movably supported by rollers 102. The frame 100 consists of a cast frame 104 pivotally carrying and supported by a crutch 106. Extending transversely from said framework and carried thereby is a delivery bed 108, and also supported by said frame is a stacking frame 110 which is additionally supported by a vertical member 112 connected to the bed 108. Adjacent said stacking frame 110 and generally level therewith is provided a shield 114 which is supported by straps 116 affixed to the cast frame 104 and which in turn support a receiving and folding means. In order to raise and to lower the end of our machine providing the receiving means, and if our drive is to be associated with a mangle, in order to adjust it to said mangle, a rod assembly 107 is provided operable by a hand wheel 109, a threaded end portion 111 of which extends into a threaded socket 113 connected to the crutch 106. Universal joints 115 on either side of the cast frame 104 connect the threaded portion 111 with an intermediate linking portion and the hand wheel 109, said universal joints being adapted to provide a bearing surface which permits pivoting the crutch 106 in response to turning the hand wheel 109. Additionally as will appear hereinafter, various rollers, valves, pulleys, motors, and control means are supported by the cast frame 104 and associated supporting members.

Generally, the device contemplates the folding, stacking, counting, and delivery of flat pieces through operation of means associated with the structure heretofore described. The machine is particularly adapted for juxtapositioning with an ironing machine or mangle shown as 118 and which type device is well known in the art and which delivers upon conveyer belts or the like 120 a flat, freshly ironed piece of laundry 122. As shown in Figures 1 and 3, the flat piece 122 is progressed on the conveyer belt 120 toward the end thereof but is picked up by a flexible arm 124 extending from the aforementioned receiving portion of our device, which will hereinafter be more completely described. Thereafter the piece 122 is caught between the belt portion 126 and the idler wheel 128, is pulled onto our device and forms an initial longitudinal fold about the said belt portion 126.

Progressing along the said belt portion 126, as shown in Figures 4, 7 and 8, the piece reaches the end of said belt and a portion thereof passes over a gap 130 on to a complementary belt portion 132 whence the leading edge of said piece 122 triggers an actuator which pivots a blade 134 through the gap 130 to tuck the said piece between the transverse folding rollers 136, the flat piece 122 now thereby being given a longitudinal and a transverse fold.

Associated with the folding rollers 136 is an S-shaped guide strip 138 which turns the folded piece 122 and introduces the top of said piece into clamped and suspended association between the endless belts 140 and 142, after which said piece is carried suspended vertically in its aforementioned folded condition. After traveling for a certain distance suspended between said endless belts 140 and 142, the leading edge of the piece 122 strikes another trigger which causes a perforated or foraminous plate 144 to pivot within the stacking frame 110 whilst releasing the said flat piece 122 from the endless belts 140 and 142 and carrying said flat piece 122 to stacked position on a stack 146 of previously folded flat pieces 122 on a stacking platform 148.

By a mechanism which will be described fully hereinafter, after a predetermined number of flat pieces have been deposited on the stacking platform 148 in the manner just described, said platform drops to deposit the said stack 146 upon a delivery carriage 150 which rides outwardly on the bed 108 to deliver said stack freshly folded and counted.

The first step in the operations above described is that of removal of the flat piece 122 from the conveyer belt 120, which is accomplished by the hereinafter described means. As heretofore stated, a shield 114 is supported by straps upon the cast frame 104. The said shield 114 is comprised of two flat plates, journaled in which are a series of sheaves 152. A second pair of plates forming a complementary shield 154 adjacent said shield 114 but slightly spaced therefrom, is supported by straps 156 and 158 which are affixed to the cast frame 104 and the stacking frame 110 respectively. Said shield 154 journals sheaves 160 similar to the sheaves 152, and idler sheaves 162 and 164 are carried respectively by the straps 116 and 156. The sheaves 152, 160, 162 and 164 support an endless belt 166 referred to heretofore as belt portions 126 and 132, the belt portion 126 being adjacent the receiving end of our device, and the belt portion 132 being on the other side of the gap 130. It will be noted that the belt 166 does not traverse the gap 130, but rather runs on each side parallel thereto and passes under an idler sheave 168. As shown best in Figures 4, 7 and 14, the idler sheave 168 is rotatably supported by a stud running into a transmission box 170 which is supported by the cast frame 104 and from which projects the driving sheave 172 which drives the belt 166. Power intake to the transmission box 170 is by virtue of a belt 173 connecting a motor 174 hung from the cast frame 104 and a sheave 176 connected with the transmission box 170.

At the receiving end of our device is provided, as aforesaid, a thin, flexible arm or strap 124. A bifurcated end 178 of said arm 124 connects said arm pivotally and in a freely floating manner to the shaft of the first sheave 152, thus permitting the said thin, flexible arm 124 to rest lightly on the belt 120 of the mangle 118 and to conform itself to the oncoming flat piece 122 whereby said oncoming flat piece may be carried slidably over the said arm 124 to the belt portion 126. A safety device 180 is shown in association with the said thin, flexible arm 124 which is adapted, in case of bunching during folding, to permit the flat pieces 122 to drop to a table without contacting said arm 124, and will be more fully described hereinafter.

When the leading edge of the piece 122 is carried onto the belt portion 126 it rides under and is grasped between the idler wheel 128 and the said belt portion 126. The idler wheel 128 freely floats on the belt portion 126 and is journaled in the extremity of an arm 184 which is pivotally supported on a hanger 186 extending from an upper tie plate 189 being supported by the cast frame 104 by shaft 190 and by the stacking frame 110.

As the flat piece 122 is grasped by the belt portion 126 and the idler wheel 128, it is drawn from the conveyer belt 120 and assumes a longitudinally folded position about the said belt portion 126, progressing therealong and being stabilized by a second idler wheel 192 which is journaled in an arm 194 pivotally connected to the arm 184.

As the piece 122 is carried along the belt portion 126 it reaches the gap 130 and the leading edge of said piece 122 passes over the said gap 130 to be taken up by the belt portion 132, it being noted that a pair of idler wheels 196 and 198 are provided on either side of the gap 130 pivotally supported upon the upper tie plate 189 and adapted to floatably engage the said piece 122 as it travels under said idler wheels. As the leading edge of the piece 122 further progresses along the belt portion 132 it engages the trigger 200 of a microswitch 202. The microswitch 202 is carried by a bracket 204 suspended from a horizontal arm 206 which is in turn supported by the rollers 208 which engage track 210 on the upper plate 188. When the trigger 200 is tripped, the microswitch 202 closes a circuit shown in Figure 42 and activates a solenoid-controlled three-way valve 212, best shown in Figure 15, which causes piston 214 in cylinder 216 to retract and thereby pivot the blade 134 previously mentioned, which is pivotally connected to upper tie plate 189 by a sleeve bearing 131 on shaft 190, through the gap 130, thus engaging the piece 122 and tucking same in a transverse fold between the folding rollers 136. The folding rollers 136 comprise preferably rubber rollers having inner shafts 218 which extend into the transmission box 170 and are driven from the sheave 176. As shown best in Figure 41, the three-way valve 212 connects to an air pressure line 220 through a T-connection 222 and is provided with an exhaust connection 224 and connects through a conduit 225 to the cylinder 216 on the inner side of the piston 214 therein, the air pressure line 220 connecting to said cylinder 216 on the other side of the piston 214.

In blade-retracted position, the communication is maintained between the pressure line 220 leading to the cylinder 216 and the conduit 225 leading to said cylinder 216. When the solenoid within said valve is actuated by the tripping of the trigger 200, connection between the conduit 225 and the pressure line 220 is broken and the conduit 225 connected with the exhaust port 224, thus causing the piston to move inwardly and causing the blade 134 to pass through the gap 130. The blade is returned by release of the trigger 200 and consequently of the solenoid within the said valve 212 which returns the valve connections to their aforementioned state, it being noted that the outer area of the piston 214 is less than the inner area thereof.

The folding and stacking of varying sizes of flat pieces 122 are of course contemplated in our device, and in order to assure a properly placed transverse fold in the piece, the rollers 208 and track 210 which support the microswitch 202 enable said microswitch 202 and its associated trigger 200 to be placed at varying positions along the belt portion 132. As shown best in Figures 2, 7 and 17, a control box 244 is provided, supported by the stacking frame 110 and journals a pulley 246 carrying a cable 248. The cable 248 passes around a sheave 250 carried by the upper plate 188 and a sheave 251 carried by stacking frame 110, and is affixed by a screw 252 to the arm 206. A portion of the pulley 254 extends through a slot 256 in the control box 244, is calibrated and knurled and may be used to adjust the microswitch 202 and trigger 200 to varying positions along the belt portion 132 whereby varying lengths of flat pieces may be caused to trip the said trigger in such position as to permit the transverse folding midway of said length.

After the blade 134 has tucked the now transversely folded piece 122 betwixt the folding rollers 136, said piece is drawn from the belt portions 126 and 132 and passes completely between said folding rollers. Interposed between the said belt portions 126 and 132, and therefore the gap 130 and the said driven rollers, are provided two drag members 226 and 228, best shown in Figure 16. Said drag members 226 and 228 are riveted or welded as desired to a pair of guard members 230 and 232 respectively, said guard members being suitably supported by the structure, and being adapted to funnel and guide pieces 122 and keep same from being prematurely engaged by the rollers 136. The function of the drag members 226 and 228 which present flat surfaces to the pieces 122 approximately aligned with the direction of their travel is to retard the trailing portions of the piece 122 as it is drawn through the folding rollers 136 in order to smooth out any wrinkles which may have been introduced into the piece by the aforedescribed operations.

As the leading edge of the piece 122 passes through the folding rollers 136 and projects therefrom, it is met by the S-shaped guide 138 previously mentioned and which is attached to the guard member 230. The S-shaped guide causes the leading edge of the piece 122 to turn through 90 degrees and ride against a belt 140 carried by the driving pulley 234 and the idler sheaves 236, the said driving pulley 234 having a sprocket and chain connection with one of the folding rollers 136. An endless complementary belt 142 is carried by a driving pulley 238 and idler sheave 240, there being a chain and sprocket connection between the driving pulley 238 and one of the folding rollers 136. It is the function of the two belts 140 and 142 to grasp the upper part of the now longitudinally and transversely folded flat piece 122 and carry said piece freely suspended to the stacking mechanism, it being noted that the piece 122 is brought to the conjunction of the belts 140 and 142 by the fact that it is held between the folding roller 136 and the belt 140.

It will be noted that the driving pulley 238 and the idler sheaves 240 are carried by an upper plate 188, which is supported by the stacking frame 110 and tied to the upper tie plate 189, whereas the driving pulley 234 and the idler sheaves 236 are themselves journaled in a supporting plate 242 and 242A which is hinged to the said plate 188. Also, the idler sheaves 236 and 240 are staggered. This provides a freely floating, conforming means for retaining and progressing the flat piece 122 in a freely suspended and non-wrinkled condition, and prevents a too positive grasping of said piece which might result in wrinkling and distortion of same.

While the above represents basically our means for transversely folding the flat piece 122 and delivering it to the stacking mechanism, we contemplate, in particular, three variations in introducing the flat piece into the transverse folding mechanism, all dealing principally in the progress of the flat piece along the endless belt 166 achieving longitudinal folding, and thereafter its conveying to the folding rollers 136 for transverse folding.

The first of these modifications, as shown by Figures 21 and 22, contemplates the provision of rod 258 mounted vertically parallel to the gap 130 and journaled in L-straps 260 which are supported by the shield 114. The rod 258 is provided with a transverse bridge portion 262 which is normally held by the torsion spring 264 against the stop 266 to provide the said bridge portion 262 colinear with the belt portions 126 and 132. By this means, no danger is encountered of the leading edge of the piece 122 dropping into the gap 130 during progress of the said piece 122 to the trigger 200. However, after the trigger has been reached and the microswitch 202 closed to cause the blade 134 to pivot through the gap 130, said blade 134 pushes the bridge portion 262 of the rod 258 out of the way, and, as aforesaid, engages the now transversely folded piece 122 between the folding rollers 136, it being of course obvious that upon return of the blade 134 and withdrawal of the piece 122 through the folding rollers 136, the torsion spring 264 returns the bridge portion 262 to its colinear position.

The second modification, as shown by Figures 23 to 25, contemplates the complete doing away with the belt 166 and associated sheaves and the like, closes the gap 130 during conveying of the piece 122 thereon, and also provides a positive grasping of the piece 122 after it has left the conveyer belt 120 and, moreover, provides a positive longitudinal folding of same, including the stretching of said piece to remove any possible wrinkling. A shield 269, similar to the shield 114, is retained mounted as before but consisting of a pair of plates 268 and 270, forming a member of U-shaped cross-section open along its vertical edge adjacent the gap 130. Adapted to slide within said U-shaped shield and extending along in place of the shield 154 is a sliding plate 272 carried in a lower track 274 supported by the stacking frame 110, and an upper track 276 supported by the upper plate 188, the said slidable plate 272 being thus able to extend into and retract from the shield 269 to normally close the gap 130.

Adjacent the outer side of the shield 269 and slidable plate 272 are two belts 278 carried on sheaves 280 which rotate on vertical shafts 282 rotatably carried by the structure. On the opposite side of said shield 269 and slidable plate 272 and adjacent thereto are two pairs of belts 284 and 286 carried, respectively, by sheaves 288 and vertical shafts 290, sheaves 292 and vertical shafts 294, all the said shafts being supported by the structure. It will be noted that, if desired to enhance the wrinkle-removing operation of this modification, the belts 278, 284 and 286 may be slightly declined from the receiving end of our machine.

In this modification, as the flat piece 122 leaves the conveyer belt 120, it drapes over the receiving end of the shield 269 until its leading edge is grasped by the belts 278 and 284, whereafter said piece is clamped between said belts and the shield 269 and conveyed over the shield 269 where the leading edge leaves the belts 284 and is taken up by the belts 286 until said leading edge reaches the trigger 200 which, in this modification, projects through a slot 295 in the slidable plate 272. When the trigger 200 actuates the blade 134 and said blade commences to pivot toward the folding rollers 136, a toggle link 296, which engages the slot 298 in a flange 300 mounted on the slidable plate 272, causes said plate to retract from the shield 269 and open the gap 130. Upon return of the blade 134, in case the piece 122 has not cleared the said gap 130, the said slot 298 provides a lost motion means for leaving the slidable plate 272 retracted, the edge of same, by virtue of the spring 302, bearing resiliently against the piece 122 being pulled through the gap 130. After the piece 122 has cleared the gap 130, the slidable plate extends again into the shield 269.

Still a third modification, as shown by Figures 43 to 47, contemplates not only doing away with the belt 166, but an entirely novel and different system for obtaining a longitudinal fold in the pieces 122 and a free suspending of said pieces during their conveying in longitudinally folded condition to the transverse folding mechanism, thus avoiding possible binding, bunching, and wrinkling. Instead of the shields 114 and 154, we have provided at the receiving end of the machine and in advance of the guard 230 a vertical plate 291 carried by an arm 293 and tie bar 297 which are connected to the cast frame 104. As with the other modifications, the flexible pick-up arm 124 is pivotally connected by a bifurcated extremity to the said vertical plate 291. An angle support 287 is affixed to upper plate 188 and upper tie plate 189, extends to the receiving end of the device, and is provided with a supporting plate 299 which is hinged to said angle support 287. Another supporting plate 301 is likewise hinged to the angle support 287. Carried by the angle support 287 are two sets of sheaves 303 and 305, respectively, which carry the belts 307 and 309 and which are driven by a chain and sprocket 311 from an extension of the shafts 218 of folding rollers 136. Carried by the supporting plates 299 and 301, respectively, are sheaves 313 and 315 which carry belts 317 and 319. The sheaves 303, 305, 313, and 315 adjacent the rollers 136 are provided with shafts which project through their respective supporting plates and which carry chain and sprocket elements whereby the drive transmitted to the rollers 136 is transmitted to the belts 307, 309, 317, and 319. Due to the hinged relationships between the supporting plates 299 and 301 and the angle support 287, it will be seen that the belts 307 and 319, and 309 and 317, respectively, freely and independently pivotally float together to clampably engage the pieces 122 by their top portions after folding thereof over the vertical plate 291, and to longitudinally crease same as they are delivered from the pick-up arm 124 to produce a longitudinal fold in said pieces and deliver them, freely suspended and without bunching or wrinkling, past the folding rollers 136 into position for transverse folding. As in the other embodiments of the longitudinal folding mechanism, the leading edge of the pieces 122 strikes the trigger 200, actuating the switch 202, and pivoting the folding blade 134 through the gap 130. It will be noted that, in this modification, we have provided the inner extremities of guard members 230 and 232 as approaching each other aligned with the belts 307, 309, 317, and 319 and then curling slightly toward the folding rollers 136 to provide a slotted clearance and a restraining action upon the pieces 122 as they are tucked into the folding rollers 136 by the blade 134. This obviates the necessity of the drag members 226 and 228 and provides an evenly balanced pull upon the pieces 122 into the folding rollers 136.

After the piece 122 has been introduced into the folding rollers 136 by any of the aforementioned means and has progressed therefrom to suspension between the belts 140 and 142, it approaches the triggers 304 and 306 of microswitches 308 and 310, respectively, shown in Figures 17 and 19, the said microswitches being mounted slightly below the belts 140 and 142 by a bracket 312 attached to the upper plate 188. Contact by the leading edge of the piece 122 with either of the triggers 304 or 306 actuates a relay 314, shortly hereinafter to be more specifically described, and thereafter another solenoid-operated three-way valve 316, shown best in Figure 26, which functions as does the hereinbefore-described valve 212 to cause a relative retraction between a piston 318 and a cylinder 320. The valve 316 has a pressure air line 322 which is also connected to the cylinder 320 and an exhaust conduit 324 and a connecting conduit 326 between the said valve and the said cylinder 320.

As shown in Figures 26-29, pivotally connected to the end of the piston 318 is a crank 328 on shaft 330 which is journaled in the stacking frame 110 and which carries the perforated plate 144. Thus, when the piston 318 is retracted into the cylinder 320, the perforated plate 144 is caused to pivot inwardly. A cam roller 334 is mounted on said perforated plate 144 to coact with a cam follower 336 pivotally mounted on an L-shaped bracket 338 carried by the upper plate 188. As the perforated plate 144 swings inwardly, the roller 334 engages the follower 336, causing same to pivot and, through a linking arm 340, pivots the supporting plate 242 which carries the sheaves 236 and pulley 234 and thus the belt 140, the foregoing pivoting being aided by a compression spring 342 abutting on one side of the supporting plate 242 and on the other side structure connected to the control box 244. Normally, the supporting plate 242 is coplanar with the upper plate 188 as a result of gravity action, thus causing the belts 140 and 142 to clamp the piece 122. However, as a result of the pivoting away of the belt 140 from the belt 142, the piece 122 is released, and, as shown in Figures 12 and 13, as the perforated plate 144 pivots inwardly, it picks up said piece 122 which, by virtue of the perforations in the said perforated plate 144, is in effect plastered by air resistance against said plate free of wrinkles and slippage, and is conveyed to the stack 146. To further minimize any possibility of the piece slipping on the perforated plate 144, the surface of said perforated plate may be roughened as by flocking with felt in a well-known manner.

The purpose of having two microswitches 308 and 310 is to aid in achieving a staggering of the stack 146 into offset portions, each consisting of ten flat pieces 122. Referring particularly to the block circuit diagram shown in Figure 42, the switches 308 and 310 are connected in parallel to the relay 314 which is a common latching type relay having an actuating coil, a latch, and a release coil. Additionally in series with the switch 308 is a stagger switch 344 which, when normally closed, permits the energizing of the actuating coil in the relay 314 by a closing of the switch 306 to operate the valve 316 and thus the cylinder 320. Upon retraction of the piston 318, as heretofore stated, the perforated plate 144 pivots inwardly and a flat piece 122 is released to be carried to the stack 146. As the perforated plate 144 swings inwardly, a crank 346, through a connecting rod 348, pivots a rocker arm 350 about a shaft 352 mounted in the control box 244, best shown in Figures 30 and 31. Carried pivotally on the end of the rocker arm 350 opposite its connection to the connecting rod 348 is a spring-loaded pawl 354 which engages a ratchet wheel 356 on the said shaft 352 and which, upon the aforesaid pivoting of the rocker arm 350, rotates said ratchet wheel through a distance of one tooth. Also engaging the said ratchet wheel is a stopping pawl 358 carried by the control box 244. Integral with the said ratchet wheel 356 is provided a semicircular boss 360 forming in effect a cam wheel and which engages the trigger 362 of the stagger switch 344 during one-half of each revolution of said ratchet wheel 356. It will be noted that the ratchet wheel carries twenty teeth and thus during one-half of a revolution of said ratchet wheel, or in other words, through ten teeth or again through ten cycles of the perforated plate 144 and consequently the stacking of ten of the pieces 122, the said stagger switch 344 will be closed, thus permitting pivoting of the perforated plate 144 when the leading edge of a piece 122 strikes the trigger 304 of the switch 308. This will result in an aligned stack of ten of the pieces 122. On the other hand, during the ten operations of the perforated plate 144 when the cam wheel 360 is out of engagement with the trigger 362 of the stagger switch 344, the said switch will be open and the switch 308 a nullity. As a result, the piece 122 must progress beyond the trigger 304 to the trigger 306 of the switch 310 before the relay 314 can be latched, the valve 316 actuated, and the perforated plate 144 caused to swing. As a result of this, the ten pieces 122 stacked during the open period of the stagger switch 344 will be staggered or offset from the preceding ten pieces 122.

Returning to the operation during a single cycle of the perforated plate 144, as said plate swings substantially horizontally to stack a piece 122, a collar 364 on the connecting rod 348 engages a trigger 366 of a return switch 368, which energizes the release coil in the relay 314, unlatches same, and de-energizes the solenoid in the valve 316 to cause same to return the piston 318 and thus return the perforated plate 144. It will be noted that the piston 318 carries a compression spring 370, which not only cushions the impact of the perforated plate 144 at its horizontal position, but also assists in the return of said perforated plate after the closing of the return switch 368. It will further be noted that the cam roller 334 is mounted in a block 372 by a shaft 374 which permits a unidirectional pivoting of said block and cam roller against a spring 376. Thus, upon the return of the perforated plate 144 when the cam roller strikes the cam follower 336 controlling the supporting plate 242, said cam roller and block are easily pivoted out of the way of said cam follower in order not to disturb the clamping functions of the belts 140 and 142.

Figure 41:
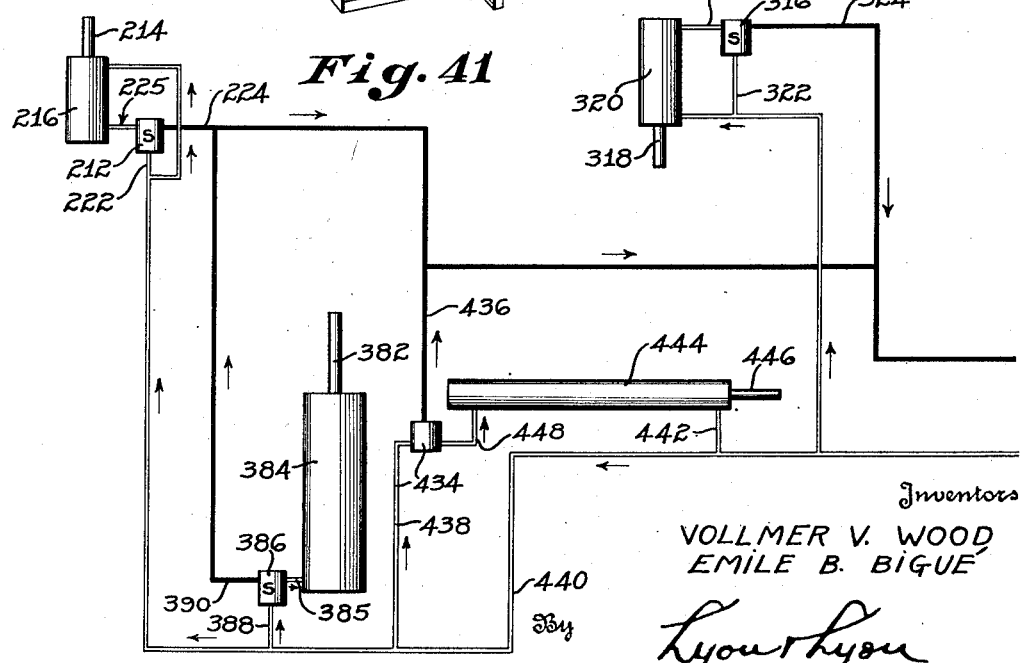
Figure 41 is a diagrammatic view illustrating the air control and operating mechanism of the machine.

In the foregoing operations, flat pieces 122 are gradually added to the stack 146 which is supported by a stacking platform 148 previously mentioned. Referring particularly to Figures 32–38, the stacking platform comprises fingers 375 extending from a body portion 377 which carries rollers 378 riding in the channel members 380, which are themselves welded or bolted to the cast frame 104 permitting vertical movement of said stacking platform 148. The said stacking platform 148 is also connected to a piston 382 slidable in cylinder 384 which connects on the inner side of said piston 382 by a conduit 385 to a three-way solenoid valve 386, as shown by Figure 41, said valve also being connected to an air pressure line 388 and an exhaust line 390, and in its normal state providing connection between the cylinder and air pressure line 388. One of the functions of the piston 382 and cylinder 384 is to act as an air cushion for the stacking platform 148 which is driven by the perforated plate 144 a certain increment downwardly equivalent to the approximate folded thickness of whatever piece 122 is stacked upon the stack 146 upon each delivery to the said platform of a piece 122 by the perforated plate 144. Mounted adjacent the channel 380 and supported by the cast frame 104 is a rack 392 which is associated with a pawl 394 carried pivotally by the stacking platform body 377 on a pin 396. Thus, when the platform is driven an increment downwardly against the cylinder 384, it is prevented from return after the stacking of each piece 122 by the engagement of said pawl 394 with the rack 392.

Concerning completing the stack 146 and referring to the ratchet wheel 356, it will be recalled that said ratchet wheel contains twenty teeth, each representing one stacking operation of the perforated plate 144. Carried on the shaft 352 which carries the ratchet wheel 356 is a spur gear 398 which engages with a gear 400 on shaft 402 mounted in the control box 244. The gear 400 is so constructed as to turn through one revolution for each two and one-half revolutions of the ratchet wheel 356 or, in other words, to fifty cycles of the perforated plate 144, i. e., fifty stacked pieces 122 on the stacking platform 148. The gear 400 carries a pin 404 which, once for each revolution of the said gear 400, strikes a trigger 405 to close the delivery switch 406. Referring to the block circuit diagram, Figure 42, it will be noted that said delivery switch is connected in series to a limit switch 408 which is mounted on the cast frame 104 and is actuated by the striking of its trigger 410 by a depending body portion 377 of the stacking platform 148. Both the switches 406 and 408 are in series with the actuating coil of a relay 414, similar to the relay 314. When both the switches 406 and 408 are closed, and at no other time, the relay 414 latches and operates the solenoid valve 386 to exhaust the air pressure from the inner side of the cylinder 384 permitting the platform 148 to drop freely. The advantage of having the switches 406 and 408 in series is that if the pieces 122 being stacked are relatively thick, by the time the pin 404 strikes the trigger 405 of the delivery switch 406 the trigger 410 of the limit switch 408 will have been closed by the contact of the platform body portion 377 and thus the relay 414 will close, permitting the platform 148 to drop containing fifty pieces 122. On the other hand, if the pieces 122 are relatively thin, when the pin 404 actuates the delivery switch 406 after one revolution of the gear 400, the body portion 377 will not have contacted the trigger 410 and the limit switch 408 will not be closed to permit actuation of the solenoid valve 386 to drop the stacking platform 148. Therefore, although the body portion 377 will shortly thereafter reach the trigger 410, the closing of the delivery switch 406 must await another revolution of the gear 400, i. e., another fifty pieces 122. Consequently, depending upon whether relatively thick or relatively thin pieces 122 are being folded and stacked, the platform 148 will drop out carrying either fifty or one hundred pieces. It will be obvious that any standard electrically actuated counting indicator may be used with our machine, and we have shown in the diagram, Figure 2, a counter 416 connected with the relay 314 in such manner that for each latching of said relay, the counter indicates on the control box 244 the stacking of another piece 122.

Below the platform 148 is provided a delivery carriage 150 previously mentioned, which comprises a frame portion 418, rearward extensions 420 and upraised rails 422, the frame portion 418 carrying rollers 424 which ride in channels 426 in the bed 108. When the stacking platform 148 drops as aforesaid, the fingers 375 thereof pass between and below the said rails 422 of the delivery carriage 150, said rails thereby receiving and supporting the stack 146. Also the flange 428 of the body portion 377 of the stacking platform 148 strikes a trigger 430 mounted upon the bed 108 and actuates a delivery switch 432. The delivery switch 432 is a single-pole, double-throw switch, one side of which when closed by actuation of the trigger 430 actuates the three-way solenoid actuated valve 434 which is similar to the valve 212 and which contains an exhaust conduit 436, a T-connection 438 to the air pressure line 440 which is likewise connected through a line 442 to a cylinder 444 on the outside of a piston 446, and which communicates through a conduit 448 to the inner end of said cylinder 444. It will be noted from Figure 42 that the circuit through the aforementioned side of the delivery switch 432 passes through a reset button 450 which is normally closed and the operation of which will be hereinafter described. When the flange 428 strikes the trigger 430, the valve 434 connects the conduit 448 with the air pressure line 440, said conduit 448 being normally connected to the exhaust 436. By virtue of the difference in area on the outside and inside of the piston, the said piston 446 is projected from the cylinder 444 and, being connected to the delivery carriage 150 through a plate 452, carries said delivery carriage outwardly on the bed 108 carrying, of course, the stack 146.

When the delivery carriage 150 reaches the end of the bed 108, it strikes a trigger 454 which actuates a stacking platform reset switch 456. Again referring to the block circuit diagram, Figure 42, it will be seen that said switch 456 actuates the release coil in the relay 414, which has been latched since the closing of the switches 406 and 408 by the stacking platform 148 and the gear 400, to unlatch same and release the stacker valve 386 to return the piston 382 and thus the stacking platform 148. It will be noted that as the stacking platform 148 dropped, the pivoting pawl 394 was kicked out of engagement with the rack 392 by an abutment plate 458 and held in such position by the coaction of an indent 460 in the pawl with a spring-loaded ball 462 recessed in a supporting block 464, as such position of the pawl 394 avoids interference with the return of the stacking platform 148. Near the top of the rack 392 there projects an abutment plate 466 which, as the stacking platform reaches its upper position, kicks the pawl 394 to its rack-engaging position, it being resiliently retained in such position by the spring-loaded ball 462 which now projects into a second indent 468 in the said pawl.

It will also be noted that as the stacking platform 148 rises, the trigger 430 is released, opening the side of the switch 432 which actuated the valve 434 and closing the other side of said switch. This does not, however, return the piston 446 connected to the delivery carriage 150, but rather completes a circuit through the reset switch 456 which continues to hold the same piston 446 extended.

In this condition the machine continues, as aforedescribed, to stack more pieces 122 on the stacking platform 148 to form a new stack, while the stack 146 stays at the end of the bed 108 awaiting removal. When the attendant desires to remove the stack 146, said stack is taken from the delivery carriage 150 and the reset button 450 which is mounted in the control box is pressed to open same. Holding open said reset button opens the circuit controlling the valve 434 and retracts the piston 446 to return the delivery carriage 150 to its position below the stacking platform 148. As the said delivery carriage 150 leaves the end of the bed 108, it releases the trigger 454, throwing the reset switch 456 open, and permitting the attendant to release the button 450.

In Figures 48 to 52 there is shown a modification in the abovedescribed delivering means and in Figure 52 is shown a modified circuit diagram pertaining to said modification. In said modification, instead of the delivery carriage 150 below the stacking platform 148 there is provided a series of spaced belts 490 carried upon sheaves 492 and 494 mounted respectively on shafts 496 and 498. The shaft 498 and thus the belts 490 are driven by a belt 500 which may pass over a sheave 502 mounted on the transmission box 170 on the same shaft with the driving sheave 172 and which passes over another sheave 503 of a common well-known V-belt clutch 506. When the stacking platform 148 drops as aforesaid, the fingers 375 thereof pass between and below the said belts 490, the said belts thereby receiving and supporting the stack 146. At the bottom of the drop of the stacking platform 148, the cam plate 428 of the body portion 377 of said stacking platform 148 strikes, instead of the trigger 430, the clutch yoke arm roller 504 which normally holds, by the spring 508, the clutch 506 in disengaged position respecting the belt 500 and the shaft 498. Moving said arm 504 downwardly engages the said clutch 506, causing the belts 490 to be driven whereby they carry the stack 146 outwardly on the bed 108.

Adjacent the outward end of the bed 108 is provided a switch 510 actuated by a trigger 512 projecting upward between the belts 490. When the stack 146 trips said trigger 512, actuating the switch 510, said switch, as with the switch 456 in the aforedescribed embodiment, causes return of the stacking platform 148. The return of the stacking platform 148, of course, permits the arm 504 to lift, disengages the clutch 506, and stops the belts 490 and thus the stack 146, permitting another loading and delivery cycle to commence. It will be noted that since the belts 490 are continuous, it is unnecessary to provide a reset return means as with the aforedescribed embodiment but rather each time the loaded platform 148 drops the belts 490 merely move sufficiently to carry the stack 146 to the end of the bed 108 where, due to the switch 510, the stack 146 stops to be removed by the attendant.

Figure 48:
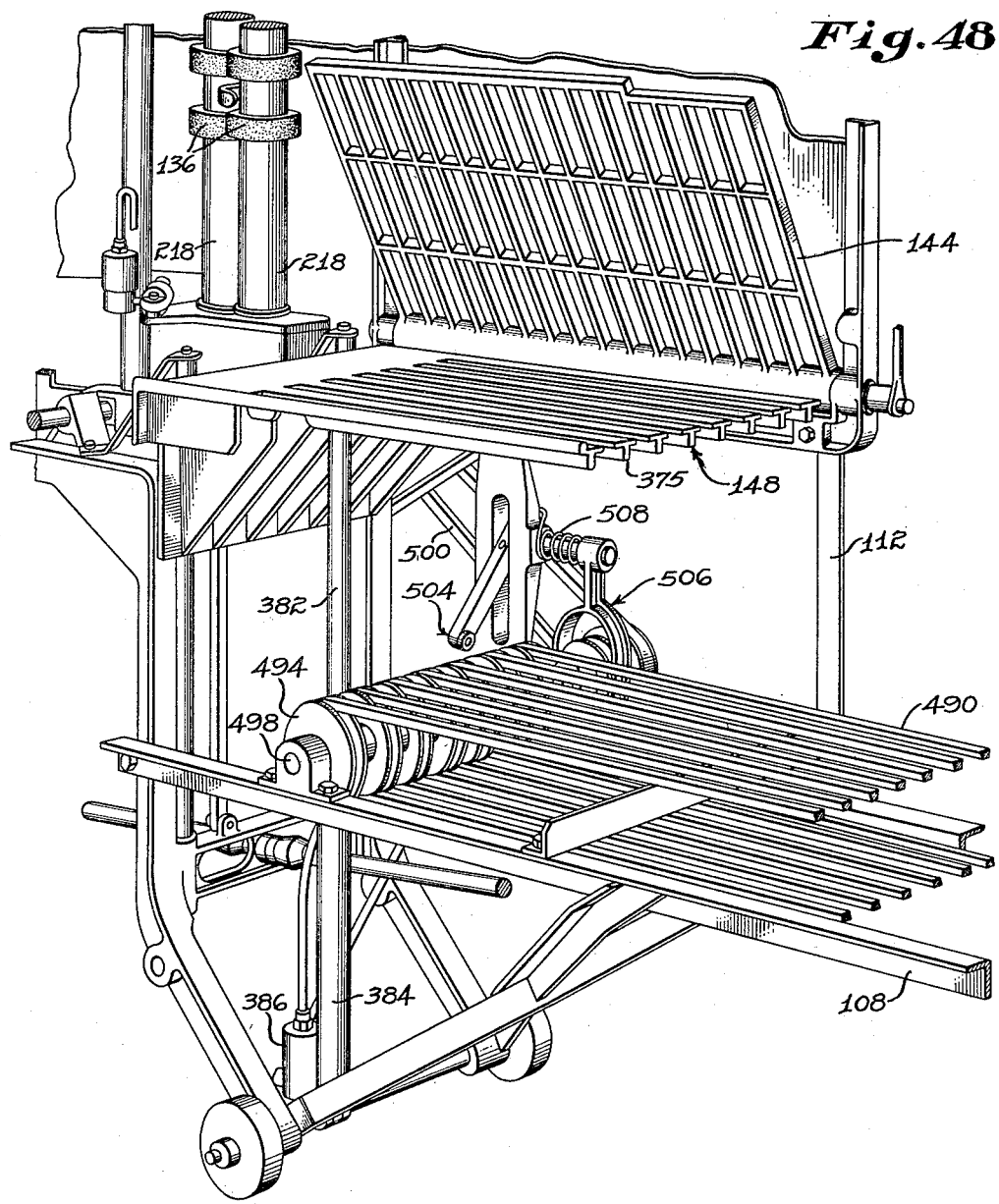
Figure 48 is a perspective view of a modified form of the machine employing a clutch mechanism to operate and stop conveyer belts.

It will be seen by the foregoing that the stacking and delivery mechanisms of our device accomplish an automatic stacking of the longitudinally and transversely folded pieces 122 delivered from the mangle 118 in ten-piece staggered portions of stacks of fifty or one hundred pieces, depending upon the thickness of the pieces and that, again automatically, said stacks are removed from the stacking platform 148 by the delivery carriage 150 or the belts 490 for delivery of each stack to the attendant. Occasionally it will be desired to cease operation of the machine and cause delivery of a stack of less than fifty or one hundred pieces. This is accomplished by provision of a normally open push button switch 470 placed in the control box, which reference to Figure 44 and the modified diagram, Figure 48, shows to be shunted across the switches 406 and 408. Thus at any stage of the stacking operation, the button switch 470 may be closed, energizing the actuating coil of the relay 414 to close said relay and operate the valve 386 to drop the platform 148, trigger the switch 432 or the clutch yoke 504 and deliver the delivery carriage 150 or belts 490 loaded with the partially completed stack to the delivery end of the bed 108.

After delivery of a stack of less than fifty or one hundred it may be desired, upon reactivation of the machine, that future stacks be delivered in amounts of fifty or one hundred. We have provided on the panel board in the control box 244 a hand wheel 471 connected to a shaft 473 which is affixed to the gear 400. The hand wheel 471 may be turned to turn the gear 400 to a position whereby the pin 404 has just left the trigger 405. Such position of the gear 400 is indicated by a pointer 477 on the hand wheel 471 and a mark 479 on the panel of the control box.

As aforestated, the operation of our device is automatic and delivers stacks of freshly folded flat pieces 122 to the attendant in unwrinkled and undamaged condition. However, in the event of bunching and jamming of the pieces 122 during folding, we have provided a safety device operable with the first two described folding embodiments shown in Figures 3 and 21, which consists of a trigger 472 which operates a switch 474 mounted on an L-strap 476 adjacent the arm 478 of the idler wheel 196. As the pieces 122 progress over the belt 166 and are tucked into the folding rollers 136, they must pass under said idler wheel 196 and if for some reason a piece is not properly fed and bunches, it will cause a raising of the idler wheel 196 and arm 478 and will trigger the switch 474. Reference to the diagram, Figure 42, will show that this switch is a single-pole, double-throw switch. Triggering said switch will open one side of same, opening the circuit of the motor terminal block 480 and closing the circuit of a solenoid 482 which is mounted adjacent the receiving end of the machine and which, through the linking arm 484 and the push arm 486, is adapted to raise the flexible arm 124 from the conveyer belt 120 to permit the piece 122 to drop free to a table adjacent the mangle 118 where said pieces may be later collected by the attendant. It will be noted from the diagram, Figure 42 and Figure 52, that a bell signal or buzzer 488 may be shunted across the solenoid 482 and mounted at any convenient place on the structure to sound and warn the attendant of actuation of said solenoid 482 and consequent lifting of the flexible pick-up arm 124.

While there has been described what is at present considered a preferred embodiment of the present invention, it will be apparent to those skilled in the art that various modifications and changes may be made without departing from the essence of the invention, and it is intended to cover herein all such modifications and changes as come within the true scope and spirit of the appended claims.

We claim:

1. In a folding and stacking machine wherein laundry pieces are delivered in a vertical plane from transverse folding means: releasable clamping means adjacent said transverse folding means adapted to freely suspend said laundry pieces and convey said pieces from said transverse folding means, said means including cooperating moving belts between which the upper edges of said laundry pieces are grasped, said belts being transversely movable to adjacent position for grasping said laundry pieces and to separated position to release said laundry pieces; a stacking platform adjacent said clamping means; a pivotable stacker member adapted upon release of said laundry pieces to carry said pieces to said stacking platform; and a cam and follower on said stacker member and clamping means whereby pivoting of said stacker member transversely moves said belts to separated position to release said laundry pieces from said clamping means.

2. In a folding and stacking machine wherein laundry pieces are delivered in a vertical plane from transverse folding means: releasable conveying means adjacent said transverse folding means adapted to freely suspend said laundry pieces and convey said pieces from said transverse folding means, said means including cooperating moving belts between which the upper edges of said laundry pieces are grasped, said belts being transversely movable to adjacent position for grasping said laundry pieces and to separated position to release said laundry pieces; a stacking platform below said conveying means; a pivotable stacker member adapted upon release of said laundry pieces to carry said laundry pieces to said stacking platform; and a cam and follower operatively associated with said stacker member and said belts respectively whereby pivoting of said stacker member cams said belts to separated position to release said laundry pieces.

3. In a folding and stacking machine wherein laundry pieces are delivered in a vertical plane from transverse folding means: supporting means adjacent said transverse folding means, said means including a pair of moving belts supported in hinged relationship to pivotally engage the upper edge of said laundry pieces and convey same freely suspended from said transverse folding means; a stacking platform adjacent said moving belts; stacker means including a plate pivotable to flatly engage said laundry pieces and convey same to said stacking platform upon release thereof from said belts; and a cam and follower operatively associated with said stacker member and said belts respectively whereby pivoting of said stacker member pivots said belts apart to release said pieces.

4. In a device of the class described wherein laundry pieces are carried by a stacker mechanism: a stacking platform below said stacker mechanism having openings therein and being adapted to receive laundry pieces from said stacker mechanism; a cushioning support normally urging said platform upwardly but permitting an incremental lowering of said platform responsive to delivery of a laundry piece by said stacker mechanism; a switch actuable upon lowering of said platform; solenoid means operable responsive to the actuation of said switch to release said cushioning support to drop said platform; and a delivery means normally below said stacking platform adapted to pass through the openings therein upon dropping thereof to receive and support said pieces.

5. In a device of the class described wherein laundry pieces are carried by a stacker mechanism: a stacking platform having openings therein and being adapted to receive laundry pieces from said stacker mechanism; a cushioning support normally urging said platform upwardly but permitting an incremental lowering of said platform responsive to delivery of a laundry piece by said stacker mechanism; a counting mechanism operatively associated with said stacker mechanism; a first switch actuable responsive to said counting mechanism upon reception of a predetermined number of laundry pieces by said platform; a second switch in series with said first switch actuable by engagement with said platform upon the lowering thereof; means operable responsive to actuation of said first and second switches to release said cushioning support and drop said platform; and delivery means normally below said stacking platform having upraised carrying portions adapted to pass through the openings therein upon the dropping thereof to receive and support said pieces.

6. In a device of the class described wherein laundry pieces are carried by a stacker mechanism: a stacking platform having openings therein and being adapted to receive laundry pieces from said stacker mechanism; a cushioning support normally urging said platform upwardly but permitting an incremental lowering of said platform responsive to delivery of a laundry piece by said stacker mechanism; a counting mechanism operatively associated with said stacker mechanism; a first switch repeatedly actuable responsive to said counting mechanism upon reception of a predetermined number or multiple thereof of laundry pieces by said platform; a second switch in series with said first switch actuable by engagement with said platform upon the lowering thereof; means operable responsive to actuation of said first and second switches to release said cushioning support and drop said platform; and delivery means normally below said stacking platform having upraised carrying portions adapted to pass through the openings therein upon dropping of said stacking platform support to receive and support said pieces.

7. In a device of the class described wherein laundry pieces are carried by a stacker mechanism: a stacking platform having openings therein and being adapted to receive laundry pieces from said stacker mechanism; a cushioning support normally urging said platform upwardly but permitting an incremental lowering thereof substantially equal to the thickness of each of said laundry pieces responsive to the delivery of each thereof; a counting mechanism operatively associated with said stacker mechanism; a first switch repeatedly actuable responsive to said counting mechanism upon reception of a predetermined number or multiple thereof of laundry pieces by said platform; a second switch in series with said first switch actuable by engagement with said platform upon the lowering thereof; means operable responsive to actuation of said first and second switches to release said cushioning support and drop said platform; and delivery means normally below said stacking platform having upraised carrying portions adapted to pass through the openings therein upon dropping of said stacking platform support to receive and support said pieces.

8. In a device of the class described wherein laundry pieces are carried by a stacker mechanism: a stacking platform having openings therein and being adapted to receive laundry pieces from said stacker mechanism; a cushioning support normally urging said platform upwardly but permitting an incremental lowering of said platform responsive to delivery of a laundry piece by said stacker mechanism; first means actuable in response to reception of a predetermined number or multiple thereof of laundry pieces by said platform; second means actuable by engagement with said platform upon the lowering thereof; and releasing means operable in response to actuation of said first and second means to release said cushioning means and drop said platform; and delivery means normally below said stacking platform having upraised portions adapted to pass through the openings therein upon dropping of said stacking platform support to receive and support said pieces.

9. In a device of the class described wherein laundry pieces are carried by a stacker mechanism: a stacking platform having openings therein and being adapted to receive laundry pieces from said stacker mechanism; a cushioning support normally urging said platform upwardly but permitting an incremental lowering thereof substantially equal to the thickness of each of said laundry pieces responsive to the delivery of each thereof; first means actuable in response to reception of a predetermined number or multiple thereof of laundry pieces by said platform; second means actuable by engagement with said platform upon the lowering thereof; releasing means operable in response to actuation of said first and second means to release said cushioning means and drop said platform; and a delivery carriage normally below said stacking platform having upraised carrying portions adapted to pass through the openings therein upon release of said stacking platform support to receive and support said pieces.

10. In a device of the class described wherein laundry pieces are carried by a stacker mechanism; a stacking platform having openings therein and being adapted to receive pieces from said stacker mechanism; a cushioning support normally urging said platform upwardly but permitting an incremental lowering of said platform responsive to delivery of a laundry piece by said stacker mechanism; a delivery member normally below said stacking platform having upraised carrying portions adapted to pass through the openings therein upon a lowering thereof to receive and support said pieces; a switch actuable by said platform upon said lowering; means operable in response to the actuation of said switch to horizontally move said delivery member to convey said pieces from said stacking platform; a switch actuable by said delivery member upon horizontal movement thereof; and means operable in response to the actuation of said switch to return said stacking platform.

11. In a device of the class described wherein laundry pieces are carried by a stacker mechanism: a stacking platform having openings therein and being adapted to receive pieces from said stacker mechanism; a cushioning support normally urging said platform upwardly but permitting an incremental lowering of said platform responsive to delivery of a laundry piece by said stacker mechanism; a switch actuable by said platform upon a predetermined lowering thereof; and means operable responsive to the actuation of said switch to release said cushioning support and drop said platform; a delivery member normally below said stacking platform having upraised carrying portions adapted to pass through the openings therein upon a dropping thereof to receive and support said pieces; a switch actuable by said platform upon said lowering; means operable in response to the actuation of said switch to horizontally move said delivery member to convey said pieces from said stacking platform; a switch actuable by said delivery member upon horizontal movement thereof; and means operable in response to the actuation of said switch to return said stacking platform.

VOLLMER V. WOOD.
EMILE B. BIGUÉ.

References Cited in the file of this patent

UNITED STATES PATENTS

| Number | Name | Date |
|---|---|---|
| 592,697 | Cormack | Oct. 26, 1897 |
| 1,586,456 | Mitchell | May 25, 1926 |
| 1,766,792 | Mayer | June 24, 1930 |
| 1,840,011 | Barber | Jan. 5, 1932 |
| 1,985,547 | Quick et al. | Dec. 25, 1934 |
| 2,177,262 | Neckel | Oct. 24, 1939 |
| 2,181,995 | Keil | Dec. 5, 1939 |
| 2,214,857 | Johnson | Sept. 17, 1940 |
| 2,277,846 | Couch | Mar. 31, 1942 |
| 2,307,822 | Clegg | Jan. 12, 1943 |
| 2,403,394 | Preston | July 2, 1946 |
| 2,424,093 | Harred | July 15, 1947 |

FOREIGN PATENTS

| Number | Country | Date |
|---|---|---|
| 521,310 | Great Britain | May 17, 1940 |